(12) United States Patent
Eiyama et al.

(10) Patent No.: US 10,625,524 B2
(45) Date of Patent: Apr. 21, 2020

(54) PRINTING APPARATUS

(71) Applicant: CANON KABUSHIKI KAISHA, Tokyo (JP)

(72) Inventors: Masato Eiyama, Yokohama (JP); Yuki Igarashi, Tokyo (JP); Masashi Kamada, Kawasaki (JP); Masashi Negishi, Kawasaki (JP); Ryoya Shinjo, Kawasaki (JP); Ryo Kobayashi, Kawasaki (JP); Tomohiro Suzuki, Kawasaki (JP); Tsutomu Obata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/906,146

(22) Filed: Feb. 27, 2018

(65) Prior Publication Data

US 2018/0257408 A1    Sep. 13, 2018

(30) Foreign Application Priority Data

Mar. 10, 2017    (JP) .................................. 2017-046414

(51) Int. Cl.
*B41J 15/04*    (2006.01)
*B41J 29/00*    (2006.01)
(Continued)

(52) U.S. Cl.
CPC ......... *B41J 15/046* (2013.01); *B41J 11/0095* (2013.01); *B41J 15/042* (2013.01);
(Continued)

(58) Field of Classification Search
CPC ...... B41J 15/046; B41J 11/0095; B41J 29/00; B41J 15/06; B41J 15/042; B41J 11/006; B65H 16/08; B65H 16/021; B65H 19/105; B65H 2403/414; B65H 2301/41394; B65H 2301/41376
See application file for complete search history.

(56) References Cited

U.S. PATENT DOCUMENTS 8,919,912 B2    12/2014  Uchida
9,073,718 B2    7/2015   Chen
(Continued)

FOREIGN PATENT DOCUMENTS

JP    05-92634 A    4/1993
JP    11-49409 A    2/1999
(Continued)

OTHER PUBLICATIONS

Extended European Search Report dated Jul. 30, 2018, in European Patent Application No. 18000208.1.
(Continued)

*Primary Examiner* — Sharon A. Polk
(74) *Attorney, Agent, or Firm* — Venable LLP

(57) ABSTRACT

A roll sheet with a continuous sheet wound in a roll form is rotated in a forward direction to supply the sheet to a printing unit. A sensor whose output is changed in accordance with a distance between the sensor and the sheet is used. A rotation direction of the roll sheet is switched from an opposite direction to the forward direction on the basis of the output of the sensor during rotation of the roll sheet in the opposite direction.

15 Claims, 26 Drawing Sheets

(51) Int. Cl.
  *B41J 15/06*   (2006.01)
  *B41J 11/00*   (2006.01)
  *B65H 16/02*   (2006.01)
  *B65H 16/08*   (2006.01)
  *B65H 19/10*   (2006.01)

(52) U.S. Cl.
  CPC .............. *B41J 15/06* (2013.01); *B41J 29/00* (2013.01); *B65H 16/021* (2013.01); *B65H 16/08* (2013.01); *B65H 19/105* (2013.01); *B41J 11/006* (2013.01); *B65H 2301/41376* (2013.01); *B65H 2301/41394* (2013.01); *B65H 2403/942* (2013.01); *B65H 2553/414* (2013.01)

(56) References Cited

U.S. PATENT DOCUMENTS

| | | | |
|---|---|---|---|
| 9,334,137 | B2 | 5/2016 | Igarashi et al. |
| 9,539,831 | B2 | 1/2017 | Tanami et al. |
| 9,579,907 | B2 | 2/2017 | Shinjo et al. |
| 9,592,683 | B2 | 3/2017 | Kobayashi et al. |
| 10,377,603 | B2 | 8/2019 | Sumioka |
| 2003/0231359 | A1 | 12/2003 | Hayashi et al. |
| 2011/0242257 | A1* | 10/2011 | Takami ................. B41J 11/006 347/218 |
| 2015/0328906 | A1 | 11/2015 | Sumioka et al. |
| 2016/0136981 | A1 | 5/2016 | Suzuki et al. |
| 2016/0137448 | A1 | 5/2016 | Sumioka |
| 2016/0207333 | A1 | 7/2016 | Igarashi et al. |
| 2017/0120636 | A1 | 5/2017 | Kobayashi et al. |

FOREIGN PATENT DOCUMENTS

| | | |
|---|---|---|
| JP | 2000-169013 A | 6/2000 |
| JP | 2004-023387 A | 1/2004 |
| JP | 2004-267274 A | 9/2004 |
| JP | 2006-240773 A | 9/2006 |
| JP | 2009-132163 A | 6/2009 |
| JP | 2011-037557 A | 2/2011 |
| JP | 2013-226759 A | 11/2013 |
| JP | 2016-098059 A | 5/2016 |

OTHER PUBLICATIONS

U.S. Appl. No. 15/902,509, Takahiro Daikoku Masashi Kamada Masato Eiyama Yuki Igarashi Masashi Negishi Ryoya Shinjo Ryo Kobayashi Tomohiro Suzuki, filed Feb. 22, 2018.

U.S. Appl. No. 15/903,493, Shuichi Masuda Masashi Kamada Masato Eiyama Yuki Igarashi Masashi Negishi Ryoya Shinjo Ryo Kobayashi Tomohiro Suzuki, filed Feb. 23, 2018.

U.S. Appl. No. 15/910,489, Tomohiro Suzuki Masashi Kamada Masato Eiyama Yuki Igarashi Masashi Negishi Ryoya Shinjo Ryo Kobayashi, filed Mar. 2, 2018.

U.S. Appl. No. 15/912,592, Midori Yasuda Yuki Kamio Masashi Kamada Masato Eiyama Yuki Igarashi Masashi Negishi Ryoya Shinjo Ryo Kobayashi Tomohiro Suzuki, filed Mar. 6, 2018.

U.S. Appl. No. 15/912,869, Masato Eiyama Masashi Kamada Yuki Igarashi Masashi Negishi Ryoya Shinjo Ryo Kobayashi Tomohiro Suzuki, filed Mar. 6, 2018.

Office Action dated Jan. 28, 2020, in Japanese Patent Application No. 2017-046414.

\* cited by examiner

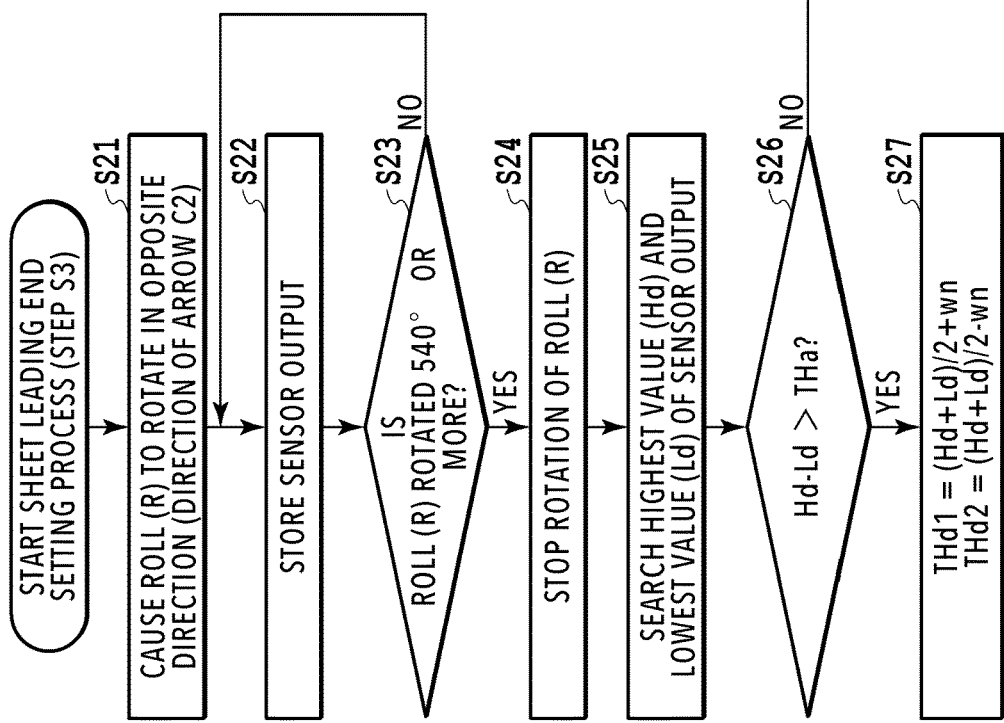

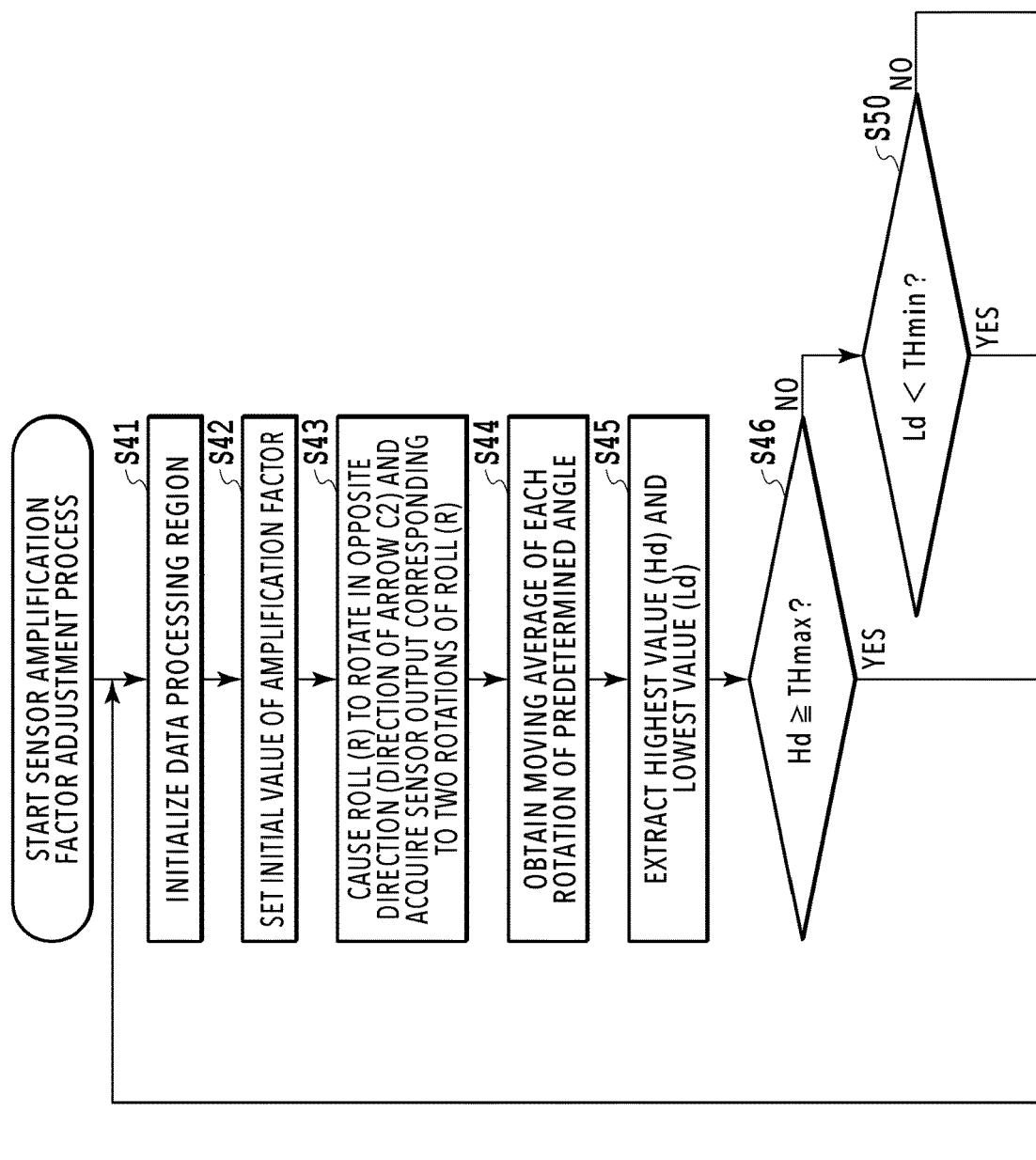

PRINTING APPARATUS

BACKGROUND OF THE INVENTION

Field of the Invention

The present invention relates to a printing apparatus that performs printing on a sheet pulled out of a roll sheet in which a continuous sheet is wound.

Description of the Related Art

A printing apparatus that automatically detects a sheet leading end of an installed roll sheet (hereinafter also referred to simply as a "roll") is disclosed in Japanese Patent Laid-Open No. 2011-37557. In this apparatus, the roll is rotated in a winding direction opposite to a supply direction, and separation of the sheet leading end from the roll due to its own weight (hereinafter also referred to as "peeling") is detected by an optical sensor placed near the roll.

The optical sensor disclosed in Japanese Patent Laid-Open No. 2011-37557 detects the peeling of the sheet on the basis of an on-output obtained by reflected light at a moment at which the leading end of the sheet peeled from the roll passes through a sensor optical axis parallel to a tangent line of the roll. A signal strength of the sensor output at this time is substantially zero until the peeled sheet leading end reaches the sensor optical axis, and a pulse-like signal is generated by reflected light at an edge of the sheet leading end at a moment at which the sheet leading end passes through the sensor optical axis. After passing through the sensor optical axis, sensor light strikes an inner surface of the peeled sheet, but since the sensor optical axis and the inner surface of the sheet are substantially parallel, and a distance between the inner surface of the sheet and the optical sensor is increased abruptly, a reflection strength is weak and a signal level after passing falls abruptly. In other words, basically, the optical sensor disclosed in Japanese Patent Laid-Open No. 2011-37557 is only able to determine a moment at which the sheet leading end passes through the sensor optical axis in the middle of peeling.

However, in the actual apparatus, in the behavior of the sheet peeling from the roll, a peeling rate (a speed at which the sheet leading end moves) changes depending on various situations such as stiffness of the sheet to be used (corresponding to return force in which a bent sheet tries to return to an original state) and electrostatic charging. Therefore, in a form in which the sheet leading end is detected using a momentary signal pulse in the middle of peeling as in Japanese Patent Laid-Open No. 2011-37557, a generation timing of the signal pulse changes depending on a situation, and it may be difficult to detect the sheet peeling with a high degree of accuracy. A timing deviation may hinder a subsequent sheet feeding operation. Japanese Patent Laid-Open No. 2011-37557 does not disclose any solutions for such problems.

SUMMARY OF THE INVENTION

The present invention provides a printing apparatus which is capable of accurately detecting the sheet peeling from the roll and performing automatic feeding of the sheet.

In the present invention, there is provided a printing apparatus, comprising:
a holding unit configured to hold a roll sheet with a continuous sheet wound in a roll form;
a printing unit configured to perform printing on the sheet supplied from the holding unit;
a driving unit configured, by rotating in a first direction, to rotate the roll sheet held in the holding unit in a forward direction and supply the sheet to the printing unit;
a sensor configured to change an output in accordance with a distance to the sheet of the roll sheet held in the holding unit; and
a control unit configured to rotate the driving unit in a second direction opposite to the first direction to rotate the sheet roll in an opposite direction, and to switch a rotation direction of the driving unit from the second direction to the first direction on the basis of the output of the sensor during the rotation of the roll sheet in the opposite direction.

According to the present invention, it is possible to accurately detect the sheet peeling from the roll and performing automatic feeding of the sheet.

Further features of the present invention will become apparent from the following description of exemplary embodiments with reference to the attached drawings.

BRIEF DESCRIPTION OF THE DRAWINGS

FIG. 11 is a diagram showing the relationship between FIGS. 11A and 11B;

FIGS. 11A and 11B are flowcharts for describing a sheet leading end setting process;

FIG. 14 is a diagram showing the relationship between FIGS. 14A and 14B;

FIGS. 14A and 14B are flowcharts for describing an amplification factor adjustment process of a sensor;

DESCRIPTION OF THE EMBODIMENTS

Figure 1:
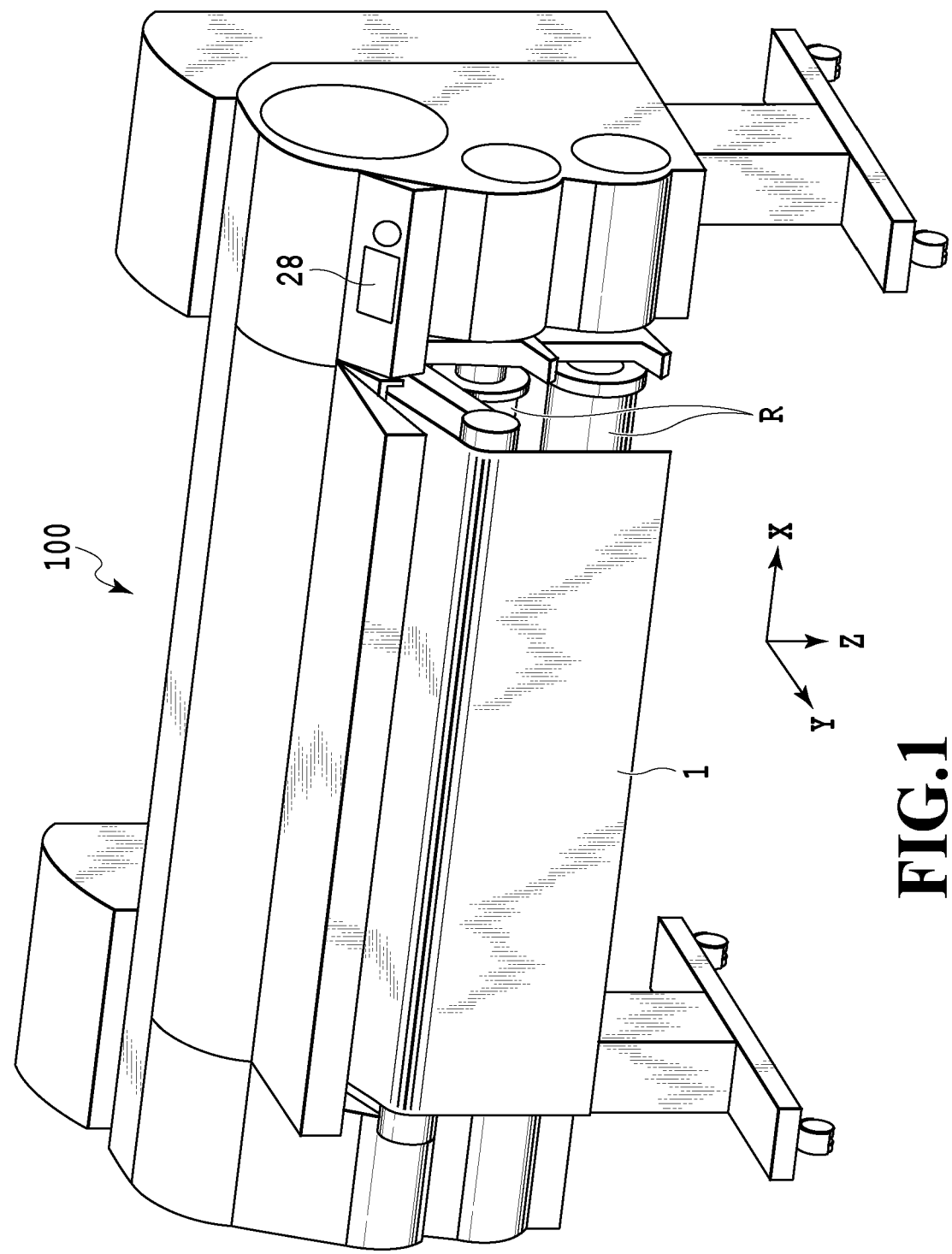
FIG. 1 is a perspective view of a printing apparatus according to the present invention.

Hereinafter, exemplary embodiments of the present invention will be described with reference to the appended drawings. First, a basic composition of the present invention will be described.

<Basic Configuration>

FIGS. 1 to 5 are explanatory diagrams of a basic configuration of a printing apparatus according to an embodiment of the present invention. A printing apparatus of the present example is an inkjet printing apparatus including a sheet supplying apparatus that supplies a sheet serving as a print medium and a printing unit that prints an image on the sheet. For the sake of description, coordinate axes are set as illustrated in the drawings. In other words, a sheet width direction of a roll R is set as an X-axis direction, a direction in which the sheet is conveyed in a printing unit 400 to be described later is set as a Y-axis direction, and a gravity direction is set as a Z-axis direction.

As illustrated in FIG. 1, in a printing apparatus 100 of the present example, the roll R (roll sheet) obtained by winding a sheet 1 which is a long continuous sheet (also referred to as a web) in a roll form can be set in each of two upper and lower roll holding units. An image is printed on the sheet 1 selectively pulled out of the rolls R. A user can input, for example, various commands to the printing apparatus 100 such as a command of designating a size of the sheet 1 or a command of performing switching between on-line and off-line using various switches installed in a manipulation panel 28.

Figure 2:
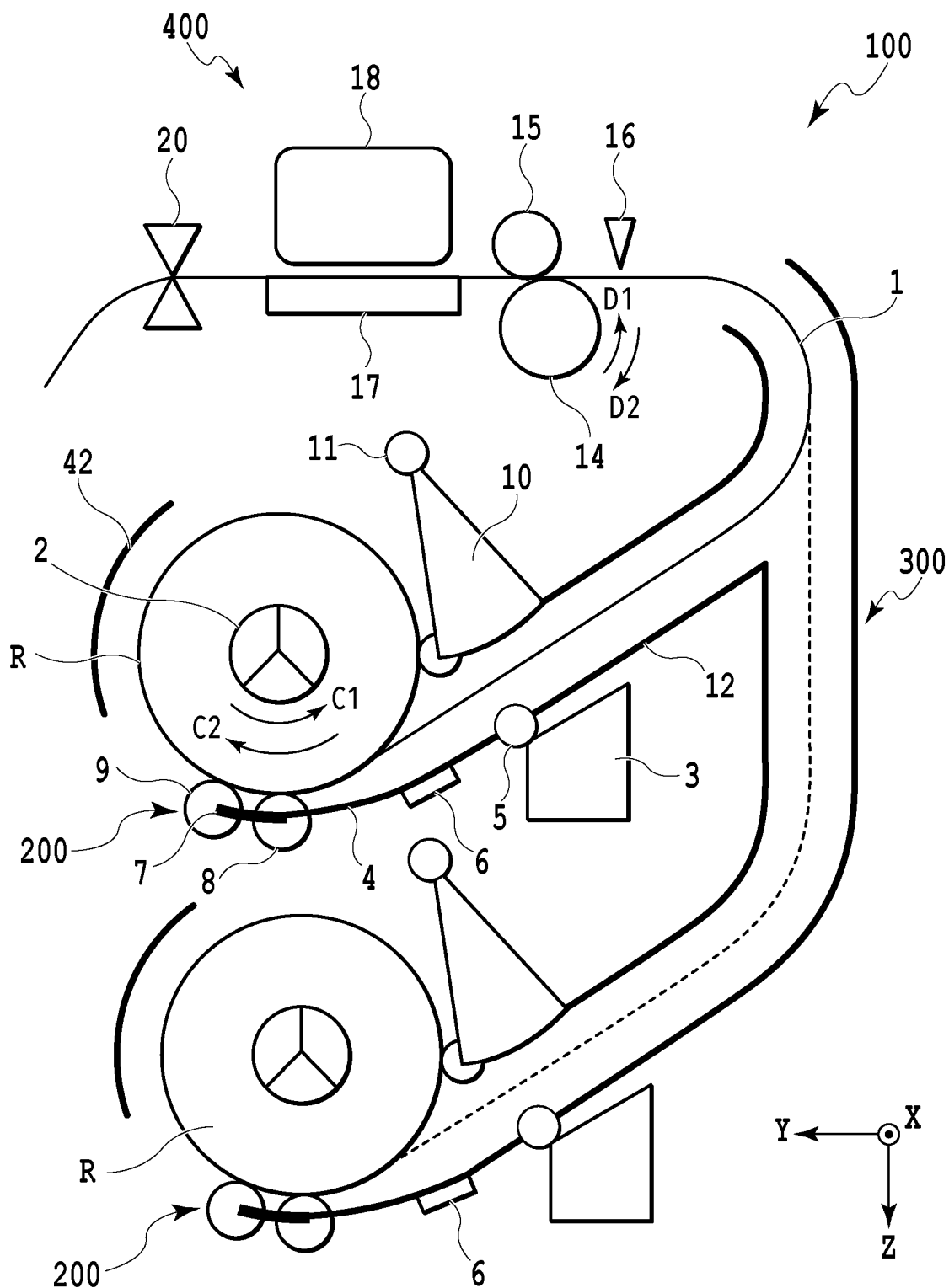
FIG. 2 is an explanatory diagram of a sheet conveyance path in the printing apparatus.

FIG. 2 is a schematic cross-sectional view of a main part of the printing apparatus 100. Two supplying apparatuses 200 corresponding to the two rolls R are installed one above the other. The sheet 1 pulled out of the roll R by the supplying apparatus 200 is conveyed, along a sheet conveyance path by a sheet conveying unit (conveying mechanism) 300, to the printing unit 400 capable of printing an image. The printing unit 400 prints an image on the sheet 1 by ejecting ink from an inkjet type print head 18. The print head 18 eject ink from an ejection port using an ejection energy generating element such as an electrothermal transducer (heater) or a piezo element. The print head 18 is not limited only to the inkjet system, and a printing system of the printing unit 400 is not limited to, and, for example, a serial scan system or a full line system may be used. In the case of the serial scan system, an image is printed in association with a conveyance operation of the sheet 1 and scanning of print head 18 in a direction intersecting with a conveyance direction of the sheet 1. In the case of the full line system, an image is printed, while continuously conveying the sheet 1, using the long print head 18 extending in a direction intersecting with the conveyance direction of the sheet 1.

The roll R is set in the roll holding unit of the supplying apparatus 200 in a state in which a spool member 2 is inserted in a hollow hole portion of the roll R, and the spool member 2 is driven by a motor 33 for driving the roll R (see FIG. 5) to rotate normally or reversely. The supplying apparatus 200 includes, as described later, a driving unit 3, an arm member (mobile body) 4, an arm rotational shaft 5, a sensor unit 6, a swing member 7, driving rotating bodies (contact bodies) 8 and 9, a separating flapper (upper side guide body) 10, and a flapper rotational shaft 11.

A conveyance guide 12 guides the sheet 1 to the printing unit 400 while guiding front and back surfaces of the sheet 1 pulled out from the supplying apparatus 200. A conveying roller 14 is rotated normally or reversely in directions of arrows D1 and D2 by a conveying roller driving motor 35 (see FIG. 5) to be described later. A nip roller 15 can be drivenly rotated in accordance with the rotation of the conveying roller 14 and can be brought into contact with or separated from the conveying roller 14 by a nip force adjusting motor 37 (see FIG. 5), and nip force thereof can be adjusted. A conveyance speed of the sheet 1 by the conveying roller 14 is set to be higher than a pulled-out speed of the sheet 1 by the rotation of the roll R, so that it is possible to apply back tension to the sheet 1 and convey the sheet 1 in a state in which the sheet 1 is stretched.

A platen 17 of the printing unit 400 regulates the position of the sheet 1, and a cutter 20 cuts the sheet 1 on which an image is printed. A cover 42 of the roll R prevents the sheet 1 on which an image is printed from entering the supplying apparatus 200. The operation in the printing apparatus 100 is controlled by a CPU 201 (see FIG. 5) to be described later. The platen 17 includes a sucking device using negative pressure or electrostatic force, and the sheet can be stably supported since the sheet is sucked onto the platen 17.

Figure 3A:
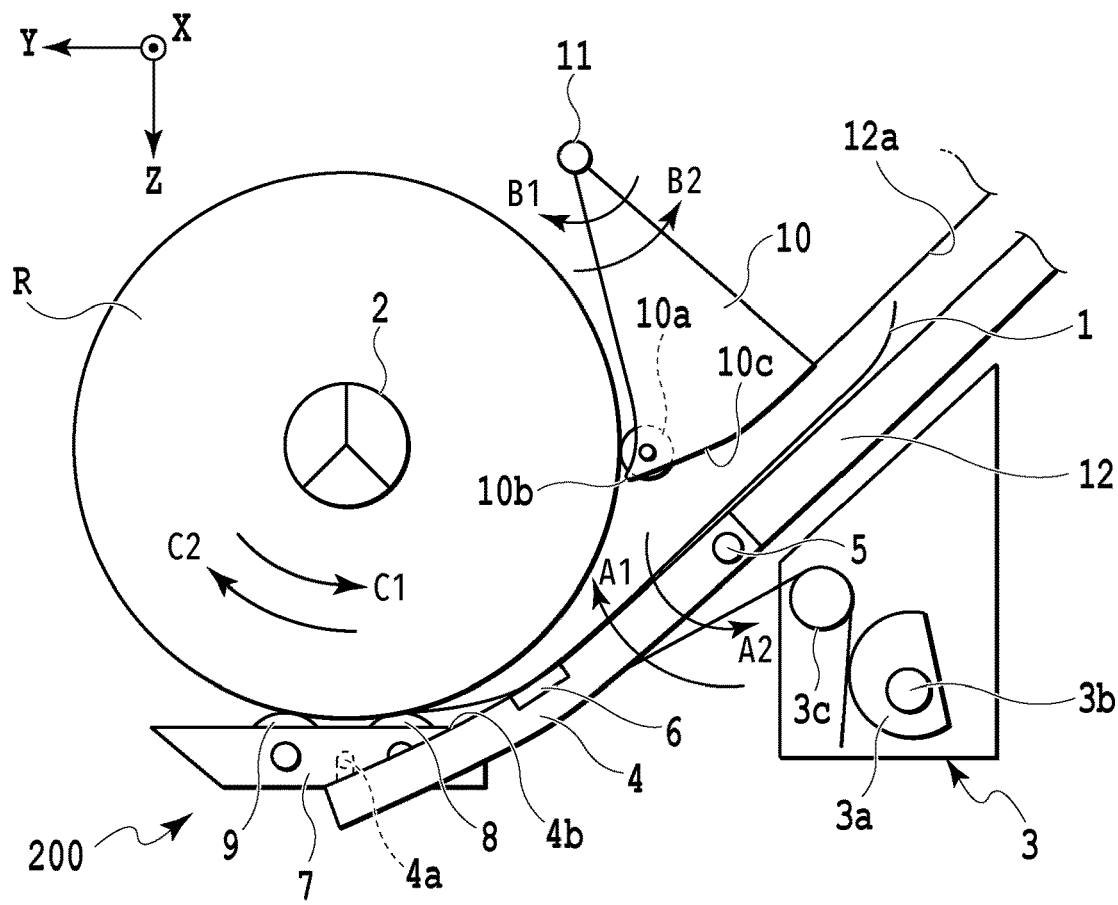
FIG. 3A is an explanatory diagram of a sheet supplying apparatus.
Figure 3B:
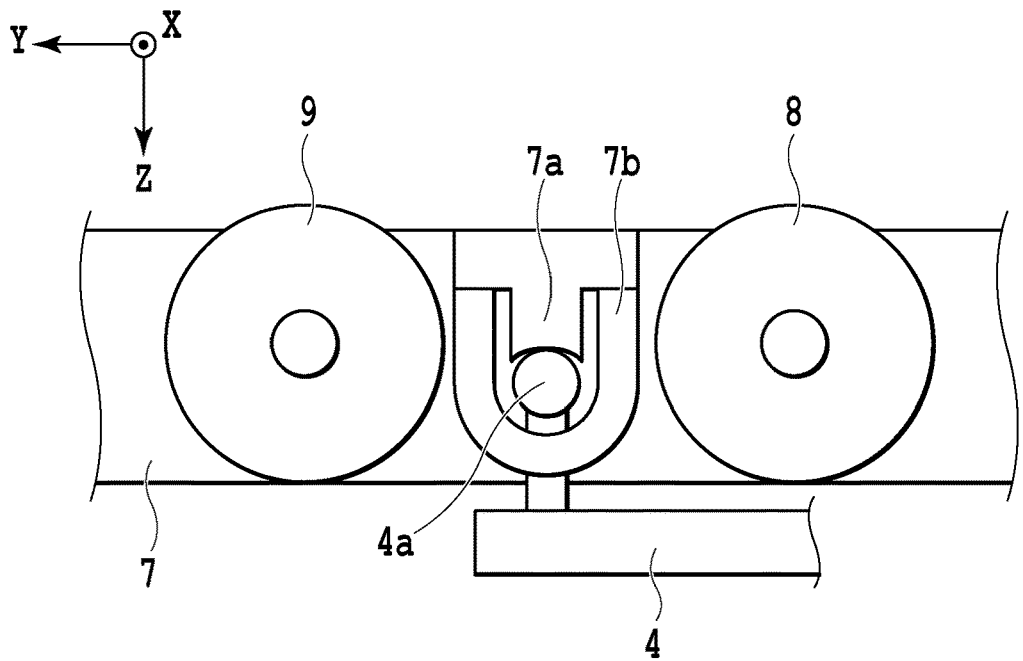
FIG. 3B is an enlarged view of a swing member in FIG. 3A.

FIGS. 3A and 3B are explanatory diagrams of the supplying apparatus 200, and the roll R in FIG. 3A is in a state in which an outer diameter thereof is relatively large. The arm member (mobile body) 4 is attached to the conveyance guide 12 to be rotatable on the arm rotational shaft 5 in directions of arrows A1 and A2. A guide portion 4b (lower guide body) that guiding the lower surface of the sheet 1 (a front surface or a print surface of the sheet) pulled out from the roll R is formed on an upper part of the arm member 4. A helical torsion spring 3c that presses the arm member 4 in the direction of the arrow A1 is interposed between the arm member 4 and a rotating cam 3a of the driving unit 3. The rotating cam 3a is rotated by a pressing force adjusting motor 34 (see FIG. 5) to be described later, and force in which the helical torsion spring 3c presses the arm member 4 in the direction of the arrow A1 changes in accordance with the rotational position of the rotating cam 3a. When the leading end portion of the sheet 1 (a part of the sheet 1 including a leading end) is set in the sheet supply path between the arm member 4 and the separating flapper 10, the pressing force of the arm member 4 by the helical torsion spring 3c is switched to three stages depending on the rotational position of the rotating cam 3a. In other words, the pressing force of the arm member 4 is switched to a pressing state by a relatively small force (pressing force of a weak nip), a pressing state by a relatively large force (pressing force of a strong nip), and a pressing force releasing state.

The swing member 7 is swingably attached to the arm member 4, and the first and second driving rotating bodies (rotating bodies) 8 and 9 which are positioned to deviate in a circumferential direction of the roll R are rotatably mounted to the swing member 7. The driving rotating bodies 8 and 9 move in accordance with an outer shape of the roll R and come into pressure contact with the outer circumferential portion of the roll R from a lower side in the gravity direction in accordance with pressing force against the arm member 4 in the direction of arrow A1. In other words, the driving rotating bodies 8 and 9 come into pressure contact with the outer circumference portion of the roll R from a lower side in the gravity direction than a central shaft of the roll R in the horizontal direction. The pressure contact force is changed in accordance with pressing force of pressing the arm member 4 in the direction of arrow A1.

A plurality of arm members 4 each including the swing member 7 are provided at a plurality of different positions in the X-axis direction. As illustrated in FIG. 3B, the swing member 7 includes a bearing portion 7a and a shaft fastening portion 7b, and thus a rotational shaft 4a of the arm member 4 is accepted with predetermined looseness.

The bearing portion 7a is provided at a gravity center position of the swing member 7 and supported by the rotational shaft 4a so that the swing member 7 has a stable attitude in each of the X-axis direction, the Y-axis direction, and the Z-axis direction. Further, since the rotational shaft 4a is accepted with looseness, any of a plurality of swing members 7 are displaced along the outer circumference portion of the roll R depending on the pressing force against the arm member 4 in the direction of the arrow A1. With such a configuration (equalizing mechanism), a change in a pressure contact attitude of the first and second driving rotating bodies 8 and 9 with respect to the outer circumferential portion of the roll R is permitted. As a result, a contact region between the sheet 1 and the first and second driving rotating bodies 8 and 9 is kept at maximum, and the pressing force against the sheet 1 is equalized, and thus a variation the conveyance force of the sheet 1 can be suppressed. Since the driving rotating bodies 8 and 9 come into pressure contact with the outer circumference portion of the roll R, the occurrence of slack in the sheet 1 is suppressed, and conveyance force thereof is enhanced.

In a main body of the printing apparatus 100 (printer main body), the separating flapper 10 positioned above the arm member 4 is attached to be rotatable on the flapper rotational shaft 11 in the directions of the arrows B1 and B2. The separating flapper 10 is configured to lightly press an outer circumferential surface of the roll R by its own weight. In a case in which it is necessary to more strongly press the roll R, biasing force by a biasing member such as a spring may be used. A driven roller (upper contact body) 10a is rotatably provided at a contact portion of the separating flapper 10 with the roll R to suppress influence of the pressing force on the sheet 1. A separating portion 10b of the leading end of the separating flapper 10 is formed to extend up to a position as close to the outer circumferential surface of the roll R as possible in order to facilitate the separation of the leading end portion of the sheet from the roll R.

The sheet 1 is supplied through the supply path formed between the separating flapper 10 and the arm member 4 after the front surface (print surface) of the sheet is guided by the guide portion 4b of the arm member 4. Accordingly, it is possible to smoothly supply the sheet 1 using the weight of the sheet 1. Further, since the driving rotating bodies 8 and 9 and the guide portion 4b are moved depending on the outer diameter of the roll R, it is possible to reliably pull out the sheet 1 from the roll R and convey the sheet even when the outer diameter of the roll R changes.

One of the features of the apparatus according to the present embodiment lies in an automatic sheet loading function (an automatic sheet feeding function). In the automatic loading, when the user sets the roll R in the apparatus, the apparatus detects the leading end of the sheet while rotating the roll R in a direction of arrow C2 in FIG. 3A (which is referred to as an opposite direction or a second direction). The second direction is opposite to a rotation direction of the arrow C1 in FIG. 3A (which is referred to as a first direction) in a case where the sheet is supplied. The sensor unit 6 is a unit including a leading end detecting sensor which detects the separation of the leading end portion of the sheet 1 from the outer circumferential surface of the roll R. If the sensor unit 6 detects the separation of the leading end portion of the sheet 1 from the outer circumferential surface of the roll sheet, the apparatus rotates the roll R in the first direction and supplies the leading end portion of the sheet 1 to the inside of the sheet supply path between the arm member 4 and the separating flapper 10. A more detailed procedure of the automatic loading function will be described later.

Further, the printing apparatus 100 of the present example includes the two upper and lower supplying apparatuses 200, and it is possible to perform switching from a state in which the sheet 1 is supplied from one supplying apparatus 200 to a state in which the sheet 1 is supplied from the other supplying apparatus 200. In this case, one supplying apparatus 200 rewinds the sheet 1 which has been supplied so far on the roll R. The leading end of the sheet 1 is evacuated up to the position at which it is detected by sensor unit 6.

Figure 4:
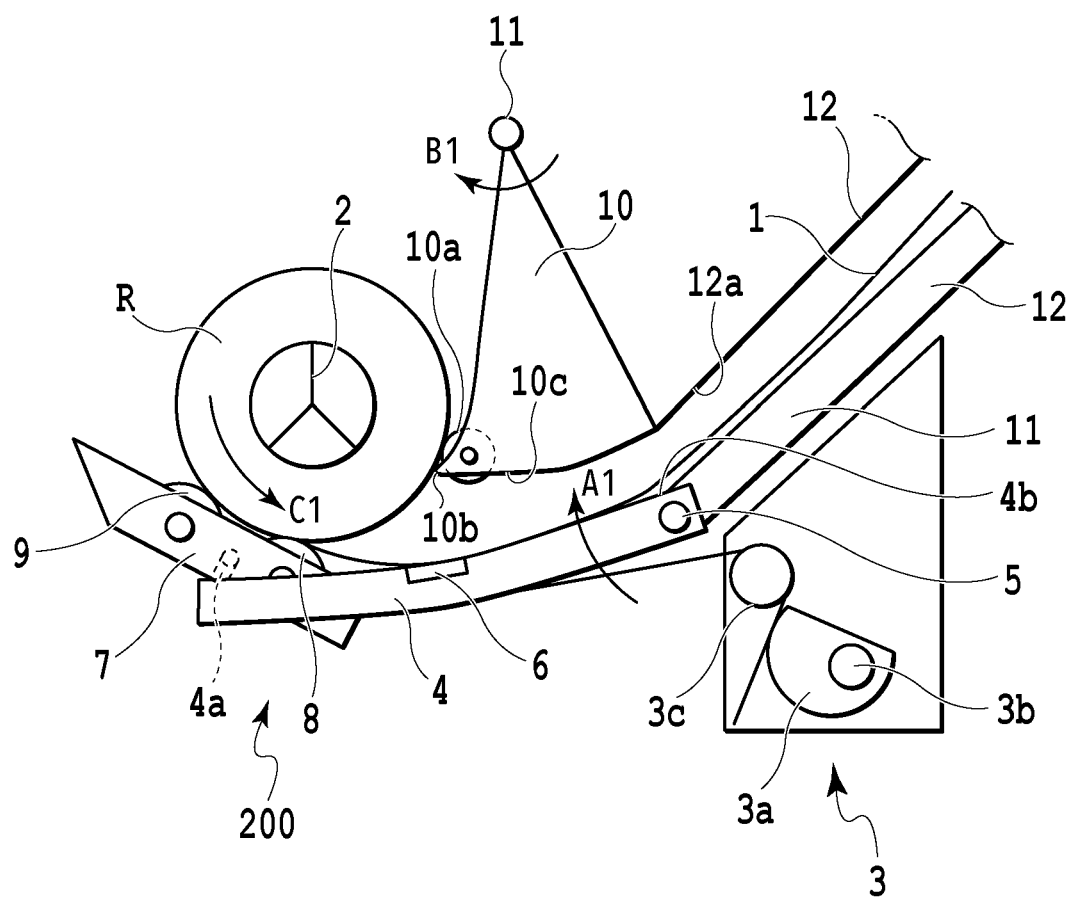
FIG. 4 is an explanatory diagram of the sheet supplying apparatus when a roll outer diameter is small.

FIG. 4 is an explanatory diagram of the supplying apparatus 200 when the outer diameter of the roll R is relatively small. Since the arm member 4 is pressed in the direction of the arrow A1 by the helical torsion spring 3c, the arm member 4 moves in the direction of the arrow A1 in accordance with a decrease in the outer diameter of the roll R. Further, by rotating the rotating cam 3a in accordance with the change in the outer diameter of the roll R, the pressing force of the arm member 4 by the helical torsion spring 3c can be maintained within a predetermined range even though the outer diameter of the roll R changes. Since the separating flapper 10 is also pressed in the direction of arrow B1, the separating flapper 10 moves in the direction of arrow B1 in accordance with the decrease in the outer diameter of the roll R. Accordingly, even when the outer diameter of the roll R is decreased, the separating flapper 10 forms the supply path with the conveyance guide 12 and guides the upper surface of the sheet 1 by a lower surface 10c. As described above, the arm member 4 and the separating flapper 10 are rotated in accordance with the change in the outer diameter of the roll R, and thus even when the outer diameter of the roll R is changed, the supply path having a substantially constant size is formed between the arm member 4 and the separating flapper 10.

Figure 5:
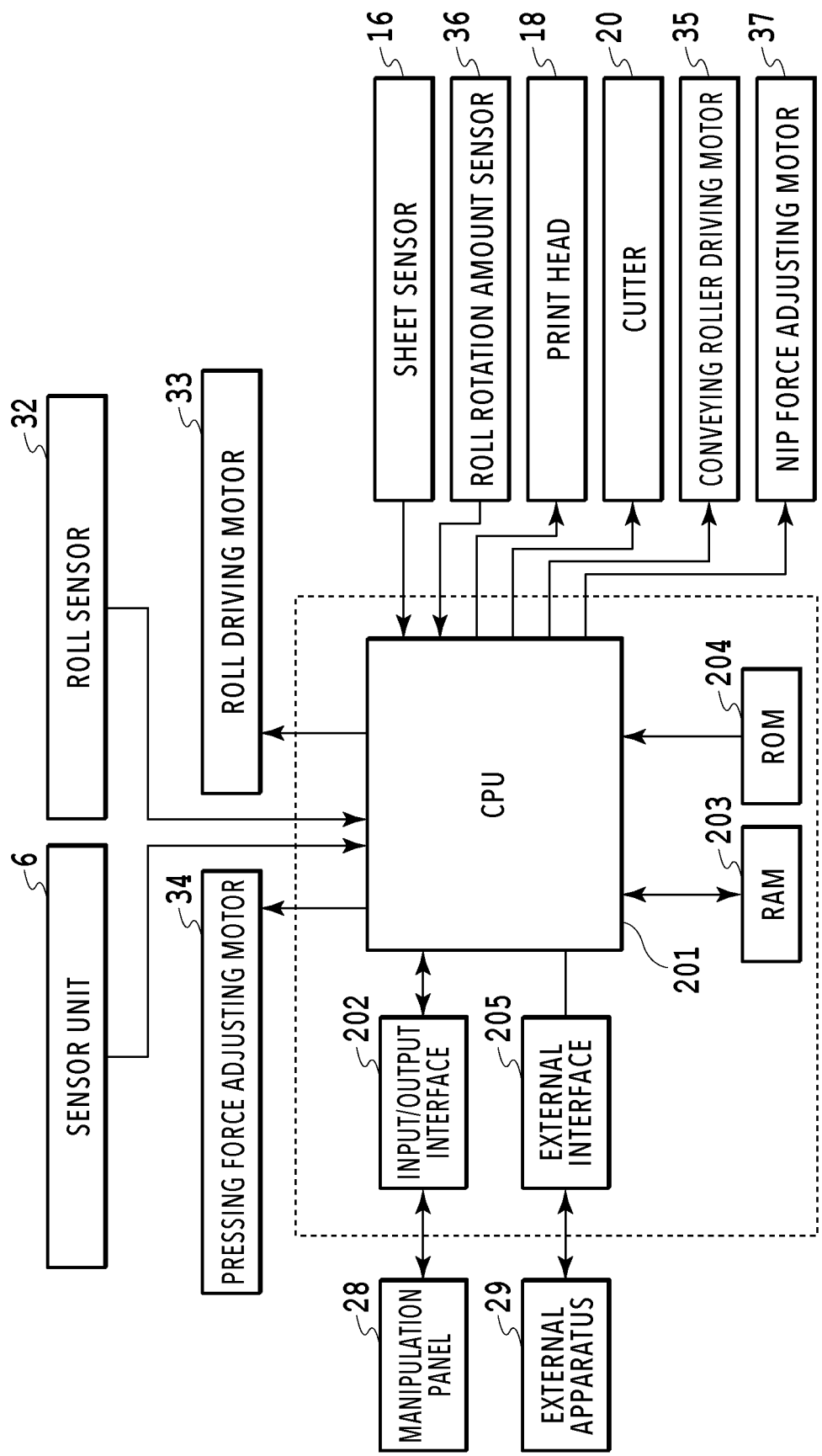
FIG. 5 is a block diagram for describing a control system of the printing apparatus.

FIG. 5 is a block diagram for describing a configuration example of a control system in the printing apparatus 100. The CPU 201 of the printing apparatus 100 controls the respective units of the printing apparatus 100 including the supplying apparatus 200, the sheet conveying unit 300, and the printing unit 400 in accordance with a control program stored in a ROM 204. A type and a width of the sheet 1, various setting information, and the like are input to the CPU 201 from the manipulation panel 28 via an input/output interface 202. Further, the CPU 201 is connected to various external apparatuses 29 including a host apparatus such as a personal computer via an external interface 205, and exchanges various information such as print data with the external apparatus 29. Further, the CPU 201 performs writing and reading of information related to the sheet 1 and the like on a RAM 203. The motor 33 is a roll driving motor for rotating the roll R normally or reversely through the spool member 2, and constitutes a driving mechanism (rotation mechanism) capable of rotationally driving the roll R. The pressing force adjusting motor 34 is a motor for rotating the rotating cam 3a in order to adjust the pressing force against the arm member 4. The conveying roller driving motor 35 is a motor for rotating the conveying roller 14 normally or reversely. A roll sensor 32 is a sensor for detecting the spool member 2 of the roll R when the roll R is set in the supplying apparatus 200. A roll rotation amount sensor 36 is a sensor (rotation angle detection sensor) for detecting a rotation amount of the spool member 2, and is, for example, a rotary encoder that outputs pulses which correspond in number to the rotation amount of the roll R.

<Sheet Supply Preparation Process>

Figure 6:
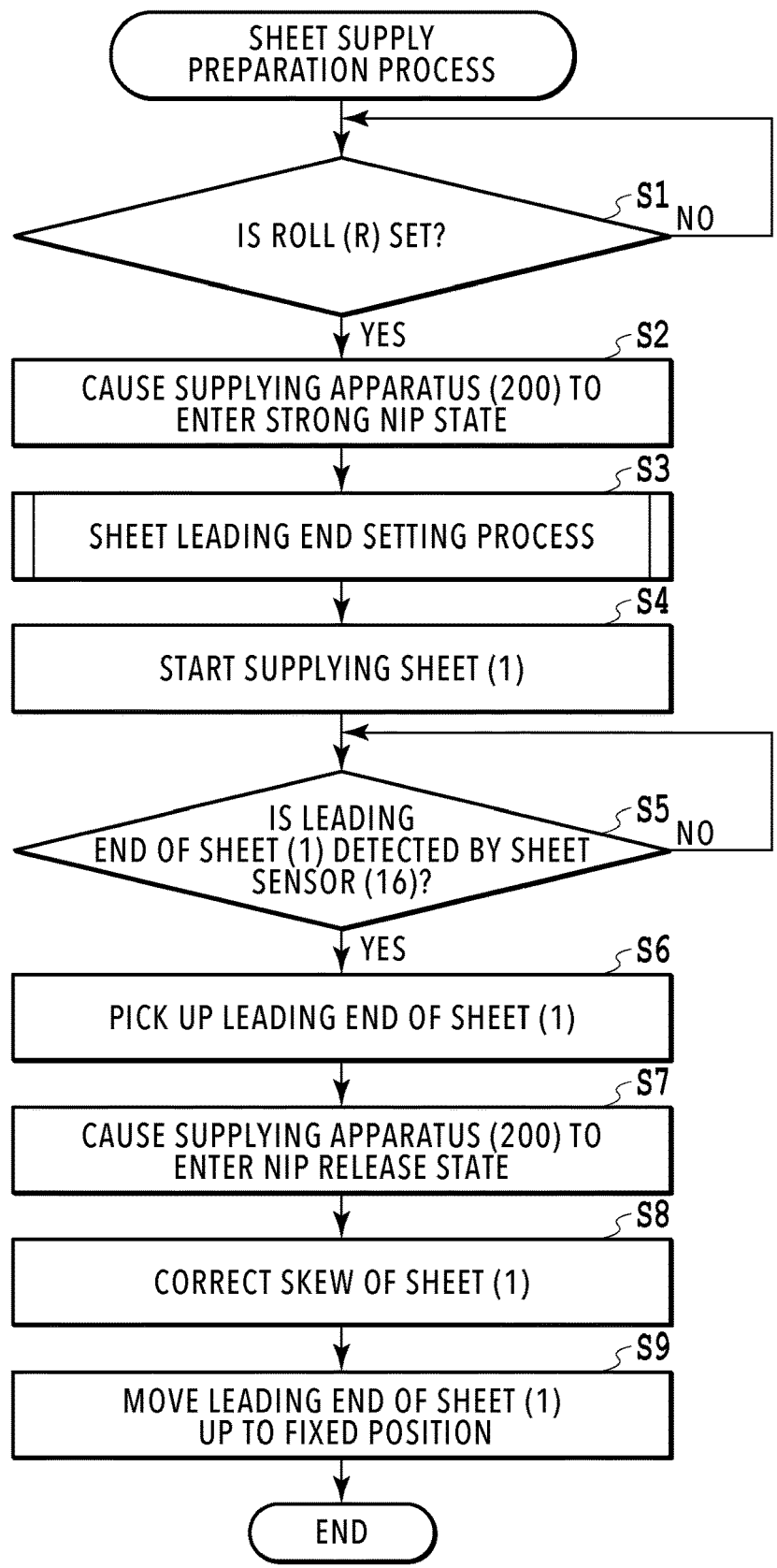
FIG. 6 is a flowchart of a sheet supply preparation process.

FIG. 6 is a flowchart for describing a supply preparation process of the sheet 1 starting from the setting of the roll R.

The CPU 201 of the printing apparatus 100 stands by in a state in which the arm member 4 is pressed in the direction of the arrow A1 by "weak pressing force" (a weak nip state), and first determines whether the roll R is set or not (step S1). In the present example, when the roll sensor 32 detects the spool member 2 of the roll R, the roll R is determined to be set. After the roll R is set, the CPU 201 switches a state in which the arm member 4 is pressed in the direction of the arrow A1 by "strong pressing force" (a strong nip state) (step S2). Then, the CPU 201 executes a sheet leading end setting process in which the leading end portion of the sheet 1 is set in the sheet supply path between the arm member 4 and the separating flapper 10 (step S3). With the sheet leading end setting process (automatic loading), the leading end portion of the sheet 1 is set (inserted) in the sheet supply path. The sheet leading end setting process will be described later in detail.

Thereafter, the CPU 201 rotates the roll R in the direction of the arrow C1 by the roll driving motor 33 and starts supplying the sheet 1 (step S4). When the leading end of the sheet 1 is detected by a sheet sensor 16 (step S5), the CPU 201 normally rotates the conveying roller 14 in the direction of arrow D1, picks up the leading end of the sheet 1, and then stops the motor 33 and the motor 35 (step S6). Thereafter, the CPU 201 cancels the pressing force of pressing the arm member 4 in the direction of arrow A1, and causes the first and second driving rotating bodies 8 and 9 to be separated from the roll R (to enter a nip release state) (step S7).

Thereafter, the CPU 201 determines whether the sheet is conveyed (skewed) in a state in which the sheet is obliquely inclined in the sheet conveying unit 300. Specifically, the sheet 1 is conveyed by a predetermined amount in the sheet conveying unit 300, and an amount of skew occurring at that time is detected by a sensor installed in a carriage including the print head 18 or installed in the sheet conveying unit 300. When the amount of skew is larger than a predetermined allowable amount, the sheet 1 is repeatedly fed or back-fed with the normal rotation and the reverse rotation of the conveying roller 14 and the roll R while applying back tension to the sheet 1. With this operation, the skew of the sheet 1 is corrected (step S8). As described above, when the skew of the sheet 1 is corrected or when an operation of printing an image on the sheet 1 is performed, the supplying apparatus 200 is set to enter the nip release state. Thereafter, the CPU 201 causes the sheet conveying unit 300 to move the leading end of the sheet 1 to a standby position (a fixed position) before printing starts in the printing unit 400 (step S9). Accordingly, the preparation for supplying the sheet 1 is completed. Thereafter, the sheet 1 is pulled out from the roll R with the rotation of the roll R and conveyed to the printing unit 400 by the sheet conveying unit 300.

The sheet leading end setting process (step S3) of FIG. 6 in the basic configuration of the printing apparatus 100 will be described below as embodiments of the present invention.

First Embodiment

In the present embodiment, an optical sensor whose output varies in accordance with an interval with the front surface (print surface) of the sheet 1 is used as the sensor unit 6. Then, after the separation of the leading end portion of the sheet 1 from the outer circumferential surface of the roll R is detected on the basis of a change in the output of the sensor unit 6 during the rotation of the roll R in the opposite direction (the direction of arrow C2), the roll R is rotated in the forward direction of arrow C1 to supply the sheet 1.

Figure 7:
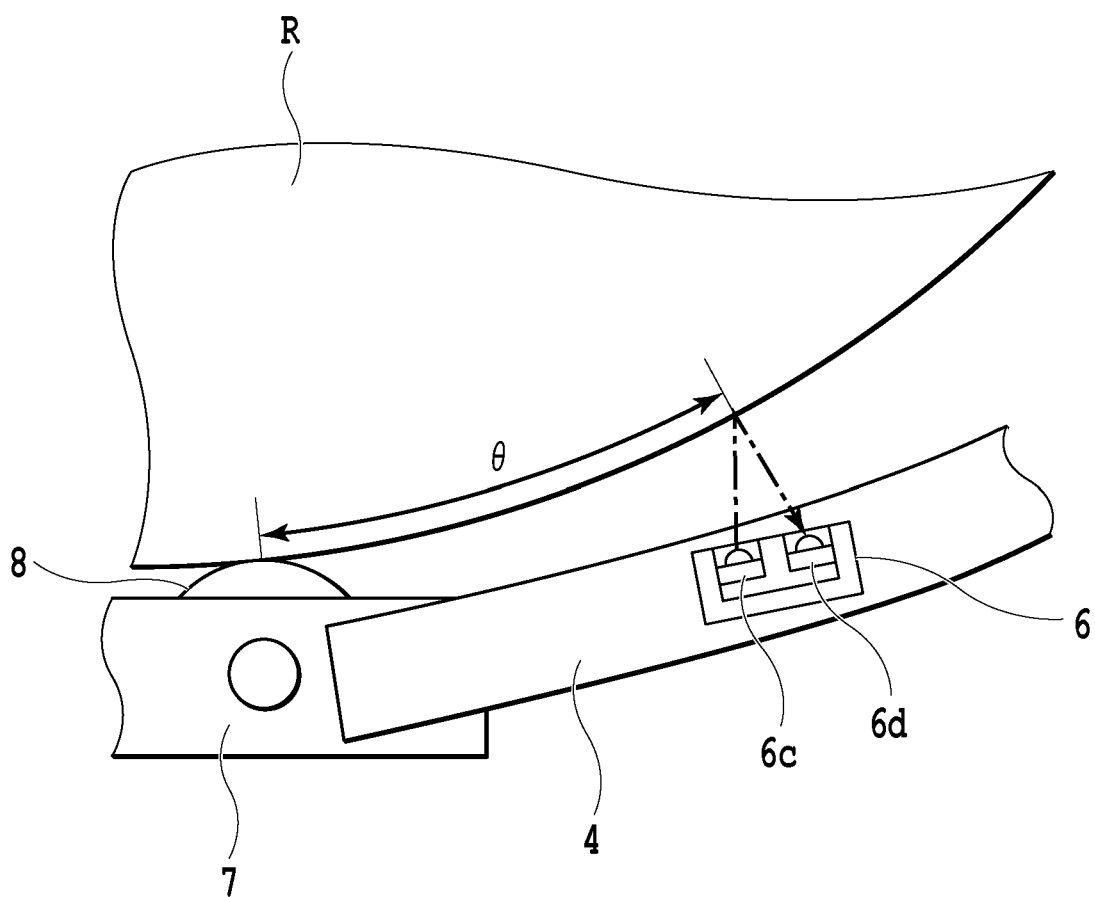
FIG. 7 is an explanatory diagram of a sensor unit in a first embodiment of the present invention.
Figure 8:
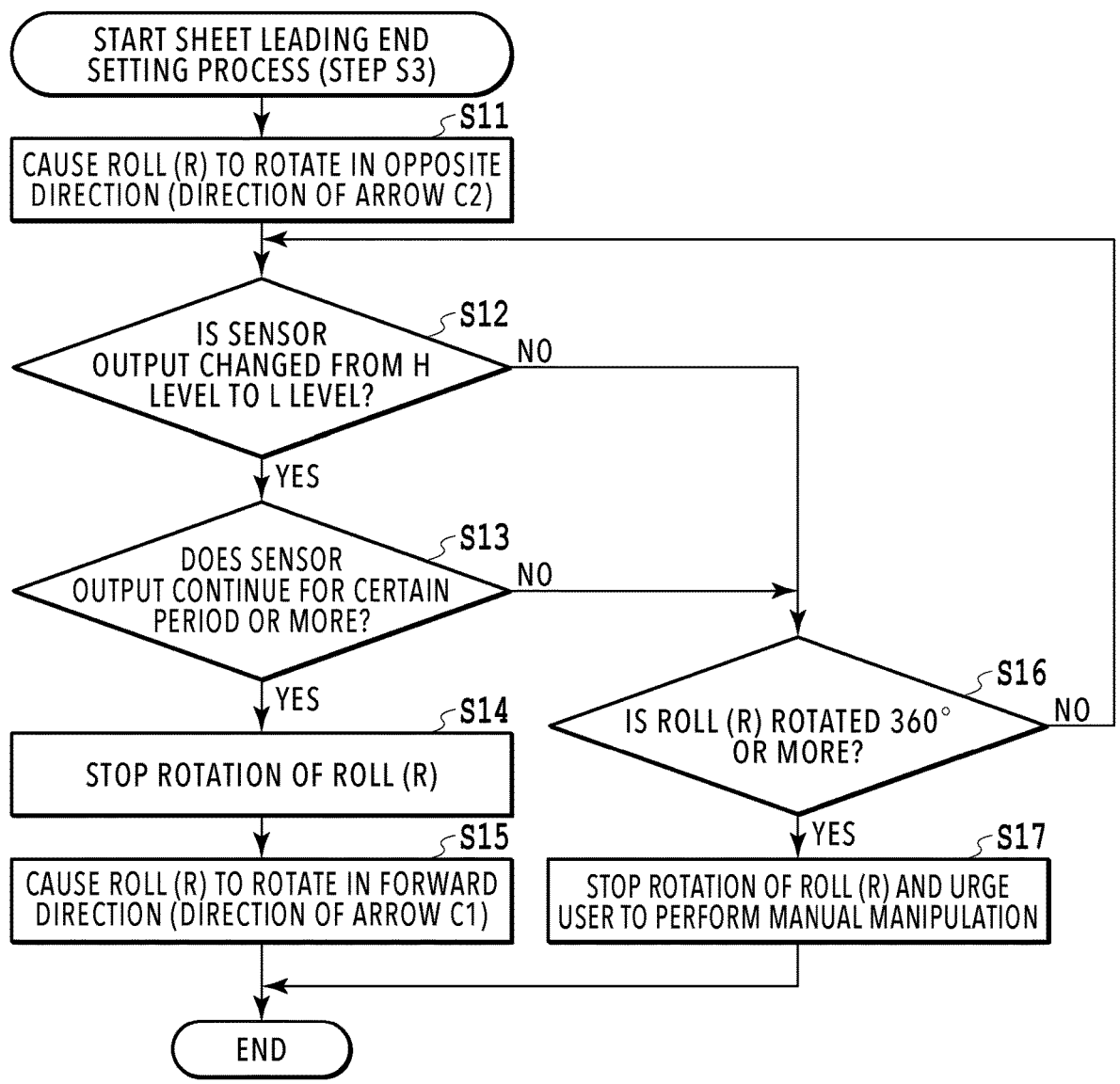
FIG. 8 is a flowchart for describing a sheet leading end setting process.

A light emitting unit 6c such as an LED and a light receiving unit 6d such as a photodiode are incorporated into the sensor unit 6 of the present example as illustrated in FIG. 7. Light irradiated from the light emitting unit 6c toward the roll R is reflected by the front surface of the sheet 1 in the roll R and then detected by the light receiving unit 6d. The light which is irradiated from the light emitting unit 6c and then detected by the light receiving unit 6d includes regular reflection light reflected from the front surface of the sheet 1 in the roll R. An output value of the light receiving unit 6d varies in accordance with an interval between the sensor unit 6 and the front surface of the sheet 1 (the print surface on which printing is performed by the printing unit). In other words, the output value of the light receiving unit 6d increases as the distance (interval) between the sensor unit 6 and the front surface of the sheet 1 decreases and decreases as the distance (interval) increases. As long as the sensor unit 6 is configured to change an output value of a detection signal in accordance with the distance between the sensor unit 6 and the front surface of the sheet 1, the light emitting unit 6c and the light receiving unit 6d are not limited to only the LED and the photodiode. Further, the light detected by the light receiving unit 6d is not limited to the regular reflection light. The sensor unit 6 is connected to the CPU 201 (see FIG. 5), and the CPU 201 acquires a detection result of the sensor unit 6 at an arbitrary timing.

FIGS. 8, 9A, 9B, and 9C are explanatory diagrams of the sheet leading end setting process (step S3 in FIG. 6) using the sensor unit 6. As described above, the sheet leading end setting process (automatic loading) is a process of automatically inserting the leading end portion of the sheet 1 of the roll R into the sheet supply path between the arm member 4 and the separating flapper 10 after the roll R is set, and feeding the sheet 1. The arm member 4 faces the front surface of the sheet 1 (print surface or the outer surface of the roll sheet), and the separating flapper 10 faces the back surface of the sheet 1 (the inner surface of the roll sheet).

The CPU 201 determines whether the roll R is set or not (step S1 in FIG. 6). In the present example, the roll R is determined to be set when the roll sensor 32 detects the spool member 2 of the roll R. After the roll R is set, the CPU 201 performs switching to the state in which the arm member 4 is pressed in the direction of arrow A1 by "strong pressing force" (the strong nip state) (step S2 in FIG. 6).

In the subsequent sheet leading end setting process (step S3 in FIG. 6), the CPU 201 causes the roll R to rotate in the opposite direction of arrow C2 (reversely rotated) (step S11). Then, during the reverse rotation of the roll R, it is determined whether the output (sensor signal level) of the detection signal of the sensor unit 6 changes from within a H level range (within a first level range) to within an L level range (within a second level range) (step S12).

Figure 9A:
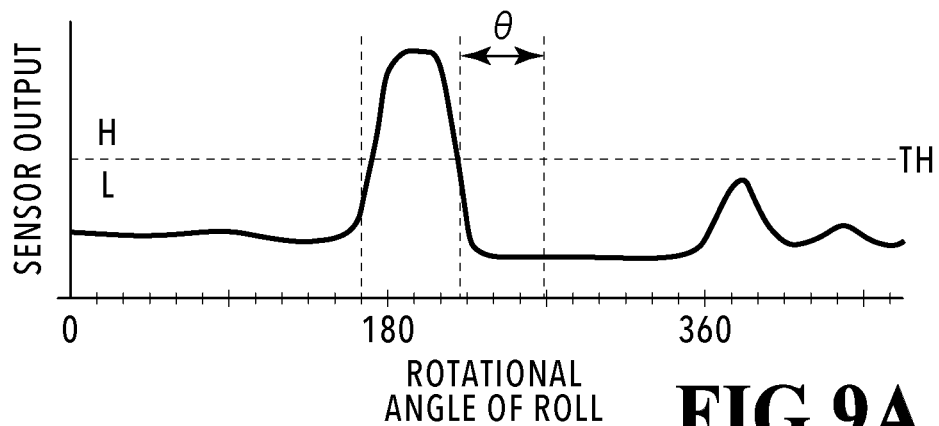
FIGS. 9A, 9B, and 9C are explanatory diagrams of a relation between an output of the sensor unit and a position of a leading end portion of a sheet.
Figure 9B:
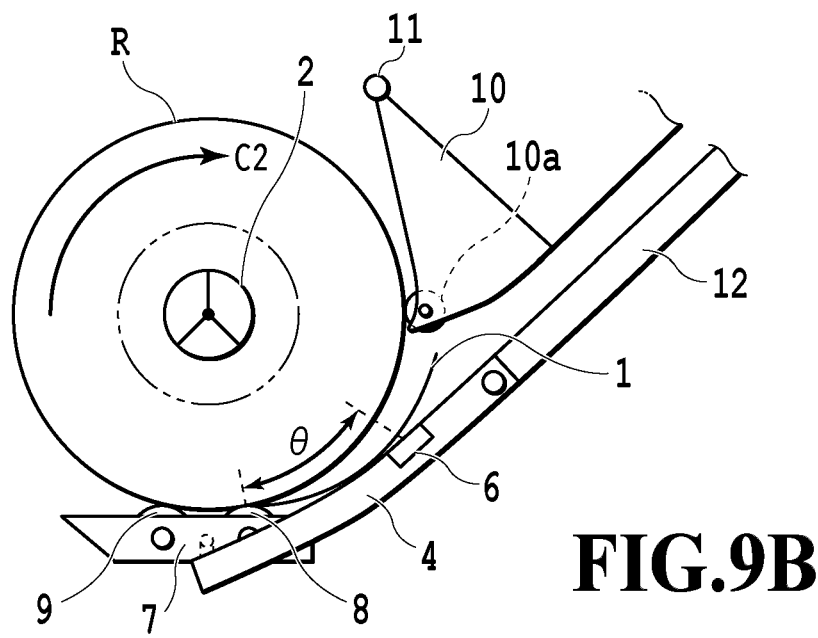

FIG. 9A is an explanatory diagram of an example of a waveform of a sensor output, and a rotational angle of the roll R at the start of reverse rotation of the roll R is set to 0°. Normally, the sensor output has an L level. When the roll R is reversely rotated 170°, the leading end portion of the sheet 1 is separated from the outer circumferential surface of the roll sheet wound on the inner side and approaches the detection position of sensor unit 6 as illustrated in FIG. 9B, the sensor output rises (increases) from the L level to the H level.

Figure 9C:
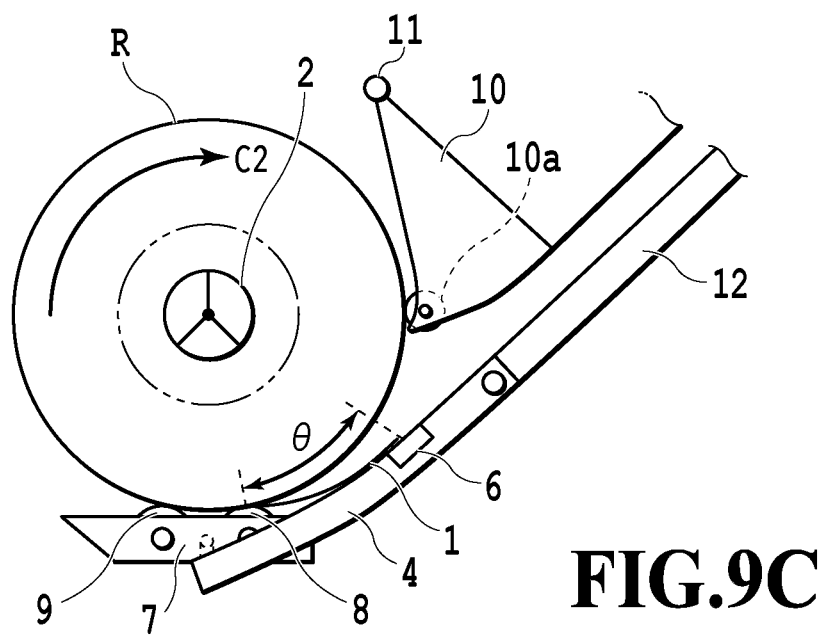

More specifically, when the roll R is rotated 170°, the leading end portion of the sheet 1 passes through an abutting position of a driven roller 10a of the separating flapper 10. Then, the leading end portion of the sheet 1 deviates from the abutting position thereof, is separated from the outer circumferential surface of the roll sheet, and falls on the arm member 4 by due to its own weight. At this time, as illustrated in FIG. 9B, the sheet moves such that the leading end portion of the sheet 1 approaches the detection position of the sensor unit 6 gradually. Further, when the roll R is reversely rotated 200°, the leading end portion of the sheet 1 passes the detection position on the sensor unit 6 as illustrated in FIG. 9C. Then, strong reflection light from the leading end portion of the sheet 1 disappears, weak reflection light from the outer circumferential surface of the roll R wound on the inside of the leading end portion is received, and the sensor output sharply drops (decreases) from the H level to the L level. Thereafter, when the roll R is further reversely rotated an angle θ, the leading end portion of the sheet 1 reaches the abutting position of the driving rotating body 8.

The H level and the L level are obtained by dividing the output strength of the sensor unit 6 into 2 levels, and the H level is output when the interval between sensor unit 6 and the sheet 1 of the roll R is small, and the L level is output when the interval is large. A threshold value TH as a boundary dividing these levels is stored in a non-volatile memory inside the printer main body or the sensor unit 6. The threshold value TH is set on the basis of sensor outputs L0 and H0. In other words, the threshold value TH is set on the basis of an intermediate value between a minimum level and a maximum level of the sensor output when the roll R is rotated once or more (for example, a plurality of times). For example, when the sensor output of the minimum level is L0, and the sensor output of the maximum level is H0, the threshold value TH can be set as the intermediate value (TH=(H0+L0)/2) of the sensor outputs L0 and H0. Since the threshold value TH fluctuates due to a variation of the sensor unit 6 or the like, it is preferable to measure the sensor outputs L0 and H0 for each individual sensor unit 6 and set the threshold value TH on the basis of the measured values.

As described above, the sensor output increases with the movement of the leading end portion of the sheet separated from the roll R toward the detection position of the sensor. Then, the sensor output decreases with the movement of the leading end portion of the sheet passing through the detection position of the sensor according to the rotation of the roll in the second direction. It is possible to reliably detect the separation of the leading end of the sheet from the roll on the basis of the change in the sensor output (a predetermined change).

As illustrated in FIG. 9B, when the leading end portion of the sheet 1 passes through the sensor unit 6, the sensor output changes from the H level to the L level, and thereafter when the L level of the sensor output continues for a certain period, the rotation of the roll R is stopped (steps S13 and S14). Specifically, after the sensor output changes from the H level to the L level, it is further determined whether or not the sensor output continuously has the L level during a certain period in which the roll R is reversely rotated a certain angle A, and the rotation of the roll R is stopped when the sensor output continuously has the L level during the certain period. The certain angle A is an angle smaller than the angle θ, and in the case of the present example, the certain angle A is half the angle θ (A=θ/2). When the rotation of the roll R is stopped in step S14, the leading end portion of the sheet 1 is positioned on the arm member 4 between the sensor unit 6 and the driving rotating body 8. Thereafter, when the roll R is normally rotated in the direction of arrow C1 (step S15), the leading end portion of the sheet 1 can be automatically inserted and fed into the sheet supply path between the arm member 4 and the separating flapper 10 (automatic loading).

When the sensor output does not change from the H level to the L level even if the roll R performs one or more reverse rotations (by a predetermined amount of 360° or more), the process proceeds from step S16 to step S17. Further, even if the roll R performs one or more reverse rotations (by a predetermined amount of 360° or more), when the L level of the sensor output is not continued for the certain period, the process proceeds from step S16 to step S17. In this case, the leading end portion of the sheet 1 is considered not to be separated from the outer circumferential surface of the roll R while the roll R performs once rotation. In step S17, the rotation of the roll R is stopped, a notification indicating that the automatic loading (automatic feeding) was unable to be executed is given to the user to urge the user to perform a manual manipulation (manual sheet feeding) for inserting the leading end portion of the sheet 1 into the sheet supply path. The user instructs the apparatus to feed the sheet when the sheet leading end portion is inserted. On the basis of the instruction, the roll R starts rotating in the forward direction and feeds the inserted sheet into the apparatus. As described above, in the present embodiment, after the roll R is set, the leading end portion of the sheet 1 can be automatically inserted into the sheet supply path and fed. Therefore, the user need not manually insert the leading end portion of the sheet 1 into the sheet supply path after the roll R is set, thereby reducing the work load when setting the roll R.

Second Embodiment

FIGS. 10A, 10B, 10C, and 11 are explanatory diagrams of a second embodiment of the present invention. An output of the sensor unit 6 changes in accordance with the interval with the sheet 1, similarly to the above-described embodiment. For example, in the case of the sheet 1 with a large basis weight and the sheet 1 with a high stiffness, when the roll R is reversely rotated in the direction of arrow C2, the sensor output is likely to change in a period until the leading end portion of the sheet 1 passes through the driven roller 10a after passing through the driving rotating body 9. In other words, during that period, the output of the sensor unit 6 may temporarily increases from the L level to the H level and then return to the L level.

Figure 10A:
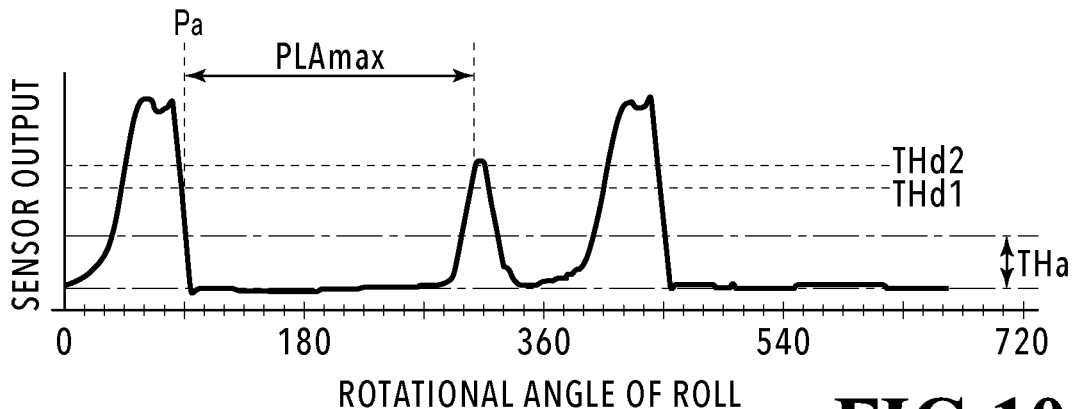
FIGS. 10A, 10B, and 10C are explanatory diagrams of a relation between an output of the sensor unit and a position of a leading end portion of a sheet in a second embodiment of the present invention.
Figure 10B:
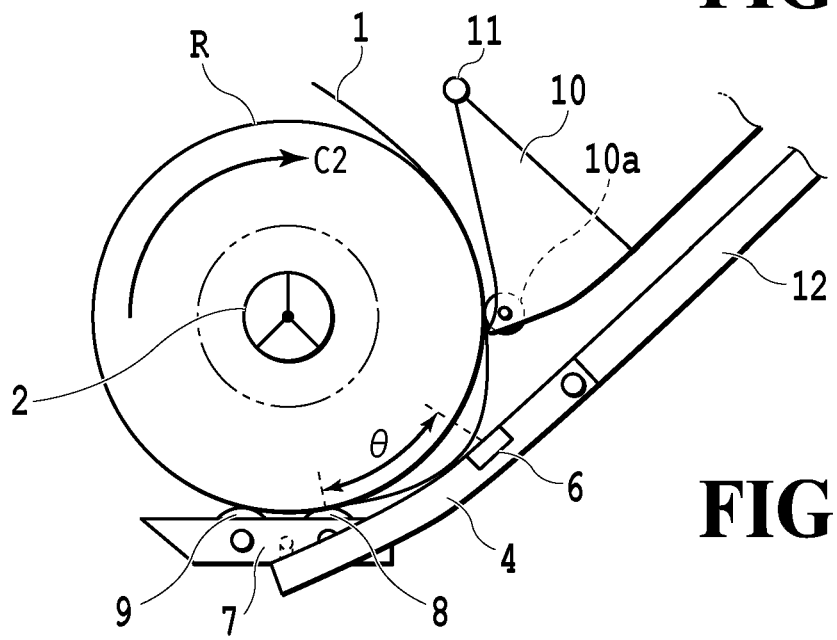
Figure 10C:
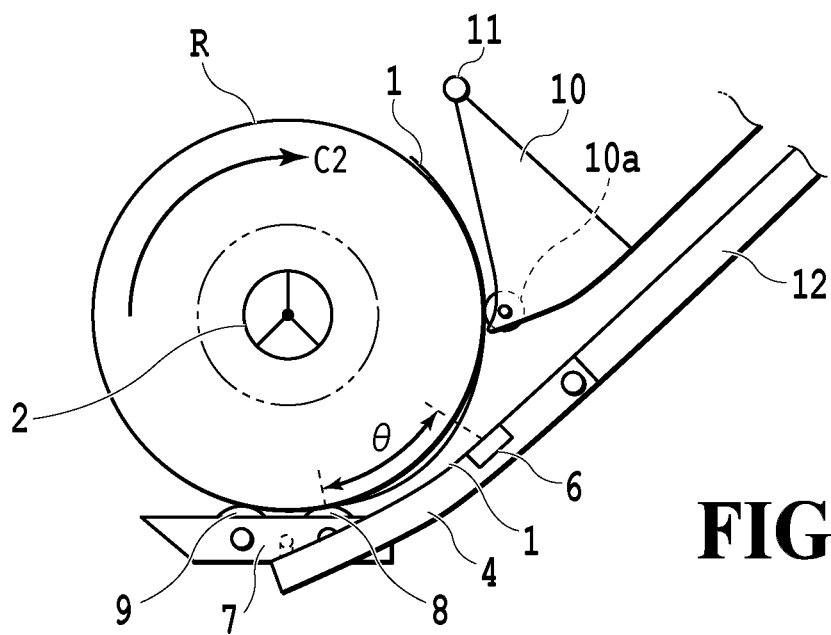

FIGS. 10A, 10B, and 10C are explanatory diagrams of an output waveform of the sensor unit 6 and a behavior of the leading end portion of the sheet 1 when the roll R of the sheet 1 having a large basis weight is reversely rotated. In a state in which the leading end portion of the sheet 1 is nearby the driven roller 10a, the roll R starts reverse rotation in the direction of arrow C2. When the roll R rotates about 45° from the rotation start position, the leading end portion of the sheet 1 passes through the driven roller 10a and drop onto the arm member 4. As a result, the output of the sensor unit 6 increases from the L level to the H level when the rotation angle of the roll R is around 45°. Thereafter, when the roll R rotates about 90° from the rotation start position, the leading end portion of the sheet 1 passes over the sensor unit 6. As a result, the output of the sensor unit 6 drops from the H level to the L level when the rotation angle of the roll R is around 90°.

Further, when the roll R continues the reverse rotation and rotates about 270° from the rotation start position, the leading end portion of the sheet 1 is positioned at the upper part of the roll R, and the sheet 1 may be bent due to its own weight of the leading end portion as illustrated in FIG. 10B. When such bending occurs, the front surface of the sheet 1 approaches the sensor unit 6. As a result, the output of sensor unit 6 increases from the L level to the H level when the rotation angle of the roll R is around 270°. Thereafter, if the roll R is further reversely rotated, the bent portion of the sheet 1 is wound around the roll R, and the sheet 1 is separated from the sensor unit 6 as illustrated in FIG. 10C. As a result, the output of sensor unit 6 returns from the H level to the L level when the rotation angle of the roll R is around 350°.

When the reverse rotation of the roll R is continued, such a change in the output of the sensor unit 6 is repeated. In the present embodiment, even when the sensor output changes as described above, it is possible to specify the position of the leading end portion of the sheet 1 and automatically insert the leading end portion into the sheet supply path between the arm member 4 and the separating flapper 10 and feed it (sheet leading end setting process).

Figure 11B:
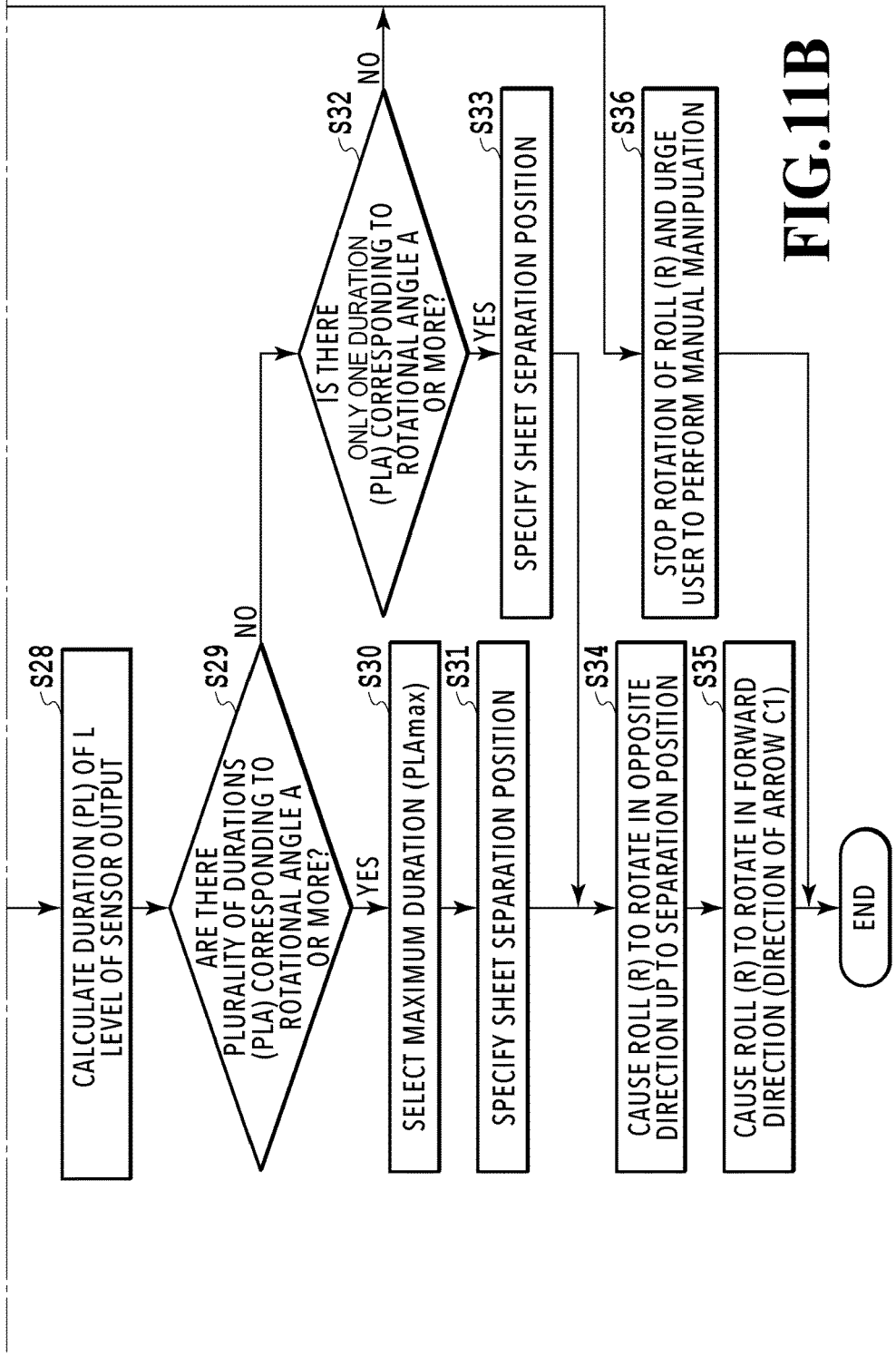

FIGS. 11A and 11B are flowcharts for describing a sheet leading end setting process (automatic loading) in the present embodiment.

The CPU 201 determines whether the roll R is set or not (step S1 in FIG. 6). After the roll R is set, the CPU 201 switches a state in which the arm member 4 is pressed in the direction of the arrow A1 by "strong pressing force" (a strong nip state) (step S2 in FIG. 6).

In the sheet leading end setting process (step S3 in FIG. 6), the CPU 201 causes the roll R to rotate in the opposite direction of arrow C2 (reversely rotated) (step S21) and stores the sensor output (step S22). For example, the CPU 201 may cause the roll R to rotate at a constant speed and cause the sensor output to be stored at regular time intervals. Further, in order to more accurately specify the position of the leading end portion of the sheet 1, the sensor output may be stored in synchronization with the pulse of the roll rotation amount sensor 36 (see FIG. 5) output in accordance with the rotation amount of the roll R. In this case, the rotation speed of the roll R need not be constant. As the sensor output, it is preferable to collected data while the roll R is performing single rotation. However, the roll R is caused to perform one or more rotations (one and half rotations (540°) in the case of the present example) in view of the slack of the sheet 1 when the roll R is set, and data is collected (step S23).

After the data collection is completed, the CPU 201 stops the rotation of the roll R (step S24), and extracts a highest value Hd and a lowest value Ld of the sensor output from the data of the sensor output stored in the RAM 203 (step S25). Thereafter, it is determined whether or not a difference (Hd−Ld) between the highest value Hd and the lowest value Ld exceeds a value (THa) necessary for specifying the position of the leading end portion of the sheet 1 (step S26). The threshold value THa may be a fixed value or may be set for each type of sheet 1. Further, for example, the value THa may be changed in accordance with a high humidity environment in which the sheet 1 swells, or a low temperature and low humidity environment in which the stiffness of the sheet 1 is strong.

When the difference (Hd−Ld) exceeds the value (THa), the CPU 201 calculates threshold values THd1 and THd2 for determining the H level and the L level of the sensor output on the basis of the highest value Hd and the lowest value Ld (steps S26 and S27). Threshold values THd1 and THd2 are set as independent threshold values with hysteresis in view of a noise variation wn caused by signal disturbance or the like. The change of the sensor output from the H level to the L level is determined using threshold value THd1, and the change from the L level to the H level is determined using the threshold value THd2. Depending on a type of sheet, reflection characteristics of light differ, and thus the sensor output value of the sensor unit 6 fluctuates. Therefore, the threshold values THd1 and THd2 are set on the basis of the data of the sensor output when the roll R is rotated. In a case in which a position of a leading end portion of a known sheet is specified, values saved in the ROM 204 (see FIG. 5) in advance may be set as the threshold values THd1 and THd2. When a SN ratio of the acquired highest value Hd and lowest value Ld is sufficiently large, a single intermediate value between the highest value Hd and the lowest value Ld may be set as the threshold value for determining the change of the sensor output from the H level to the L level and the change from the L level to the H level.

Thereafter, the CPU 201 analyzes the data of the sensor output stored in the RAM 203 and obtains a duration PL of the L level after it changes from the H level to the L level on the basis of data of one rotation of the roll R (step S28). The rotation angle of the roll R corresponding to the duration PL may be calculated on the basis of an output pulse of the roll rotation amount sensor 36 (see FIG. 5) or data obtained for every given period of time. When the sensor output changes a plurality of times, and there are a plurality of durations PLAs corresponding to the rotation angle A of the roll R or more, the CPU 201 selects a maximum duration PLA max (steps S29 and S30). Thereafter, the CPU 201 specifies a position at which the leading end portion of the sheet 1 is separated from the outer circumferential surface of the roll R (step S31). Specifically, a change point Pa of the sensor output immediately before the maximum duration PLA max is specified as illustrated in FIG. 10A. The change point Pa corresponds to a position at which the leading end portion of the sheet 1 is separated from the outer circumferential surface of the roll R. When there is only one duration PLA corresponding to the rotation angle A or more, the position at which the leading end portion of the sheet 1 is separated is specified from the change point Pa of the sensor output immediately before the duration PLA (steps S32 and S33).

After the position at which the leading end portion of the sheet 1 is separated is specified in step S31 or S33, the CPU 201 causes the roll R to reversely rotate in the direction of arrow C2 up to the position at which the leading end portion of the sheet 1 is separated (step S34). Accordingly, the leading end portion of the sheet 1 is separated from the outer circumferential surface of the roll R and positioned on the arm member 4 between the sensor unit 6 and the driving rotating body 8. Thereafter, when the roll R is normally rotated in the direction of arrow C1 (step S35), the leading end portion of the sheet 1 can be automatically inserted into the sheet supply path between the arm member 4 and the separating flapper 10 and fed (automatic loading).

When it is determined that the difference (Hd-Ld) does not exceed the threshold value THa in step S26 or when it is determined that there is no duration PLA corresponding to the rotation angle A or more in step S32, the process proceeds to step S36. In step S36, the rotation of the roll R is stopped, a notification indicating that the automatic loading was unable to be executed is given to the user to urge the user the manual manipulation of inserting the leading end portion of the sheet 1 into the sheet supply path.

As described above, in the present embodiment, even when a temporary fluctuation occurs in the output of the sensor unit 6, it is possible to specify the position at which the leading end portion of the sheet 1 is separated from the roll R on the basis of the sensor output when the roll R is reversely rotated.

Third Embodiment

Figure 12:
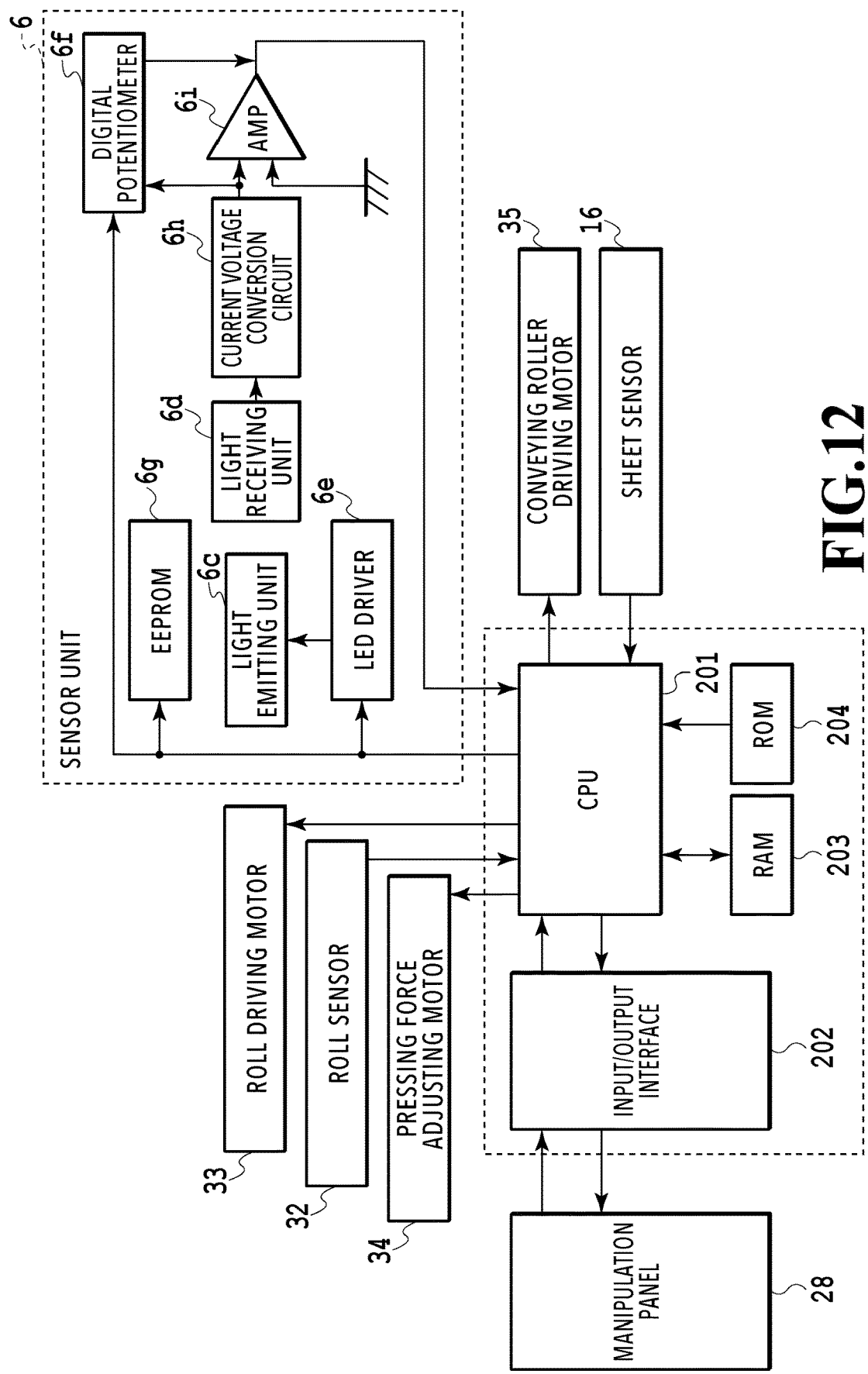
FIG. 12 is a block diagram of a control system of a printing apparatus in a third embodiment of the present invention.

FIG. 12 is a block diagram of a control system in a third embodiment of the present invention. Similarly to the first embodiment, the sensor unit 6 is a sensor whose output varies in accordance with the interval with the front surface of the roll R. In the present embodiment, an LED driver 6e with a dimming function under the control of the CPU 201 is connected to the light emitting unit 6c such as an LED, and it is possible to change an amplification factor of a light emission strength of the light emitting unit 6c by adjusting an electric current flowing to the light emitting unit 6c. A current voltage conversion circuit 6h and an amplifier circuit 6i are connected to the light receiving unit 6d such as a photodiode, and it is possible to change the amplification factor of the light receiving sensitivity of the light receiving unit 6d by adjusting a resistance value of a digital potentiometer 6f under the control of the CPU 201. Further, the sensor unit 6 includes an EEPROM 6g such as a non-volatile memory in order to store, for example, the amplification factor of the sensor unit 6 (the amplification factor of the light emission strength of the light emitting unit 6c and the amplification factor of the light reception sensitivity of the light receiving unit 6d).

Figure 13:
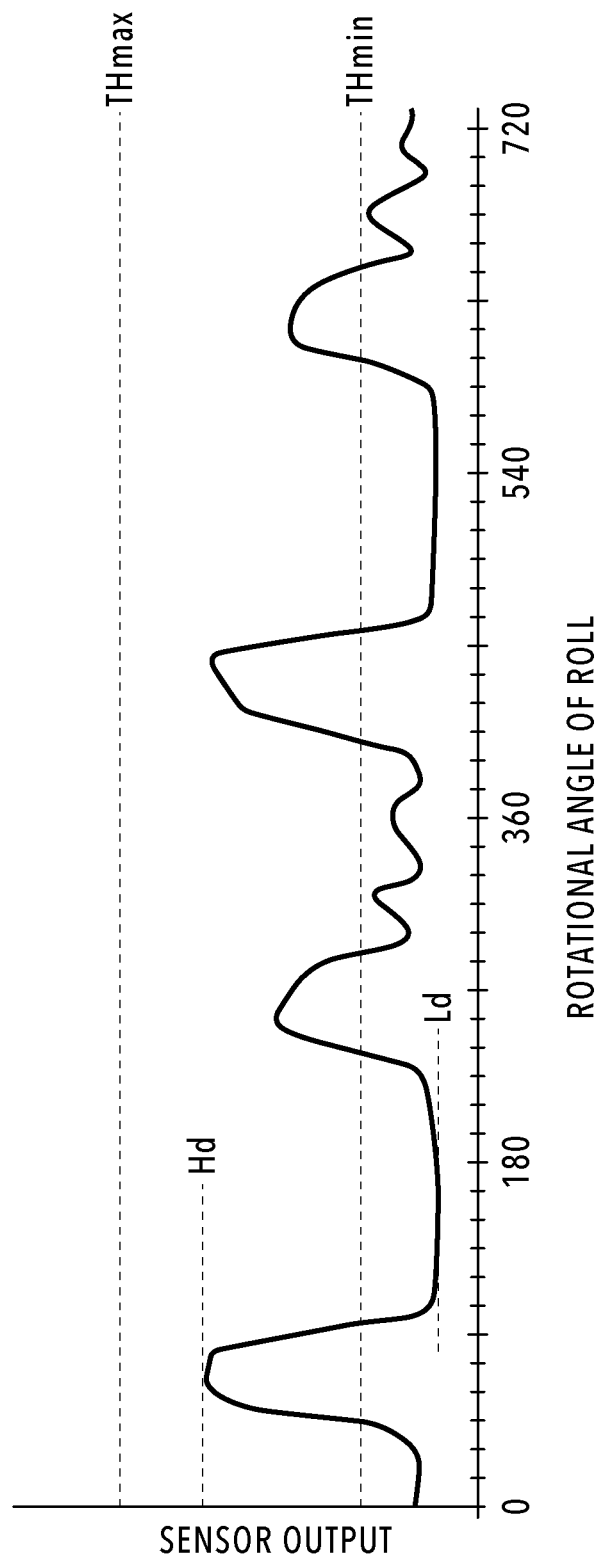
FIG. 13 is an explanatory diagram of a sensor output of a sensor unit.

FIG. 13 is an explanatory diagram of an output waveform of the sensor unit 6 when the roll R is reversely rotated. When the highest value Hd of the sensor output of the sensor unit 6 is larger than an upper limit determination value THmax, the sensor output is likely to be saturated. When the lowest value Ld of the sensor output of the sensor unit 6 is smaller than a lower limit determination value THmin, the sensitivity of the sensor unit 6 is likely to be insufficient. Further, when a difference between the highest value Hd and the lowest value Ld is less than a predetermined value, the sensor output may be affected by stationary noise, and it may be difficult to detect the leading end portion of the sheet 1. Therefore, a determination value for determining whether the difference between the highest value Hd and the lowest value Ld is sufficient or not is also set.

Figure 14B:
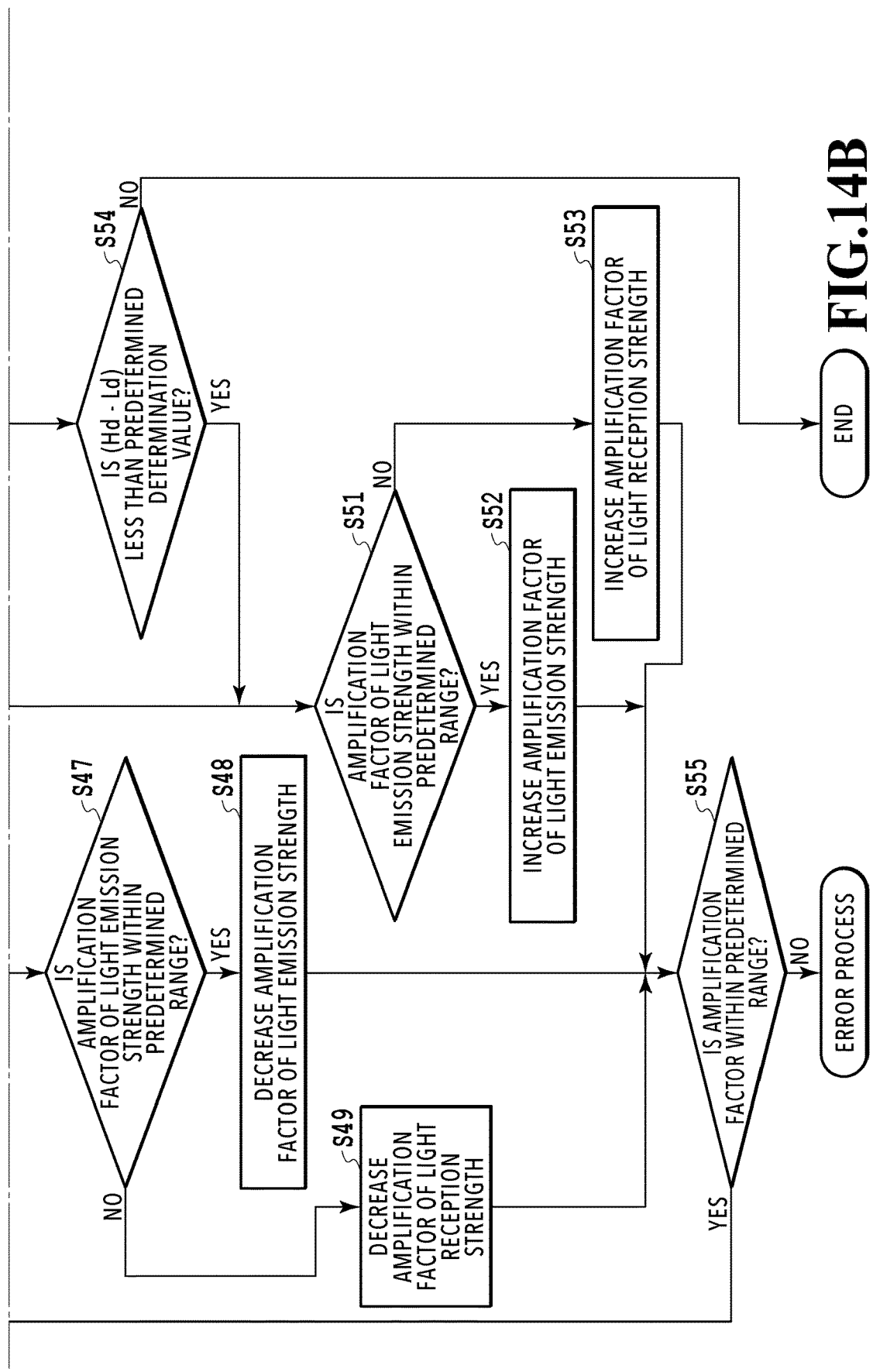

FIGS. 14A and 14B are flowcharts for describing an amplification factor adjustment process for adjusting the amplification factor (sensor amplification factor) of the sensor unit 6.

First, the CPU 201 initializes a data processing region to secure a region for processing the output data of the sensor unit 6 (step S41), and sets an initial value of the amplification factor of the sensor (step S42). The amplification factor of the sensor adjusted by a previous amplification factor adjustment process is stored in the EEPROM 6g, and such a stored amplification factor is set as the initial value. When such an amplification factor is not stored, a predetermined amplification factor is set as the initial value. In this case, the initial value of the amplification factor may be set in accordance with a type, a winding diameter, a width, or the like of roll R input by the manipulation panel 28 in advance. The winding diameter and the width of the roll R may be set in the printing apparatus main body or may be set by a driver in a terminal such as a personal computer connected to the printing apparatus in a wired or wireless manner. Further, a temperature/humidity sensor may be installed, and the initial value of the amplification factor may be set in accordance with an ambient temperature and an ambient humidity when the roll R is set.

Then, the CPU 201 causes the roll R to perform once or more rotations in the direction of arrow C2, acquires the sensor output at that time (step S43), and evaluates a moving average for each predetermined rotational angle of the roll R from the sensor output (step S44). In case of the present example, the CPU 201 obtains the sensor output for two rotations of the roll R and evaluates the moving average for each predetermined rotational angle of the roll R. The highest value Hd and the lowest value Ld of the moving averaged data are extracted (step S45), and it is determined whether the highest value Hd is equal to or larger than the upper limit determination value THmax in FIG. 13 (step S46). When the highest value Hd is equal to or larger than the upper limit determination value THmax, the CPU 201 determines whether or not the amplification factor of the light emission strength of the light emitting unit 6c is within a predetermined range (within a first allowable range) (step S47). When the amplification factor of the light emission strength of the light emitting unit 6c is within the predetermined range, the CPU 201 decreases the amplification factor of the light emission strength (step S48). When the amplification factor of the light emission strength of the light emitting unit 6c is outside the predetermined range, the CPU 201 decreases the amplification factor of the light reception strength of the light receiving unit 6d (step S49). Accordingly, it is possible to prevent a situation in which the sensor output is saturated.

On the other hand, when the highest value Hd is less than the upper limit determination value THmax, the CPU 201 determines whether or not the lowest value Ld is less than the lower limit determination value THmin (step S50). When the lowest value Ld is less than the lower limit determination value THmin, the CPU 201 determines whether or not the amplification factor of the light emission strength of the light emitting unit 6c is within the predetermined range (step S51). When the amplification factor of the light emission strength of the light emitting unit 6c is within the predetermined range, the CPU 201 increases the amplification factor of the light emission strength (step S52). When the amplification factor of the light emission strength of the light emitting unit 6c is outside the predetermined range, the CPU 201 increases the amplification factor of the light reception strength of the light receiving unit 6d (step S53). Accordingly, it is possible to increase the detection sensitivity of the sensor unit 6.

When the lowest value Ld is equal to or larger than the lower limit determination value THmin, the CPU 201 determines whether or not the difference (Hd−Ld) between the highest value Hd and the lowest value Ld is less than a predetermined determination value (step S51). When the difference (Hd−Ld) is less than the predetermined determination value, the sensor output may be affected by the stationary noise, and it may be difficult to detect the position of the leading end portion of the sheet 1. In this case, the process proceeds from step S54 to step S51 in order to increase the amplification factor of the light emission strength or the light reception strength of the sensor unit 6. When the difference (Hd−Ld) is equal to or larger than the predetermined determination value, the amplification factors of the light emission strength and the light reception strength of the sensor unit 6 are determined to be appropriately adjusted, and the amplification factor adjustment process ends.

After adjusting the amplification factor of the light emission strength or the amplification factor of the light reception strength in steps S48, S49, S52, or S53, the CPU 201 determines whether the amplification factors are amplification factors within predetermined ranges or not (step S55). In other words, it is determined whether the amplification factor of the light emission strength is within a predetermined range (within a first allowable range) and the amplification factor of the light reception strength is within a predetermined range (within a second allowable range) or not. When the amplification factors of the light emission strength and the light reception strength are within the predetermined ranges, the process returns to the previous step S41 in order to check whether or not the amplification factors are appropriate again. When the amplification factors of the light emission strength and the light reception strength are not amplification factors within the predetermined ranges, the amplification factors are determined to exceed the adjustment limits, and an error process such as an output of error display is executed. In a case where the amplification factors of the light emission strength and the light reception strength become amplification factors within the predetermined ranges, the numbers of increases or decreases of the amplification factors in steps S48, S49, S52, or S53 may be counted, and an error process may be executed when the count values are equal to or larger than a predetermined number.

As described above, in the present embodiment, it is possible to optimize the output of the sensor unit 6 by adjusting the amplification factors of the light emission strength and the light reception strength of the sensor unit 6 on the basis of the sensor output when the roll R is caused to perform one or more reverse rotations. Therefore, it is possible to reliably specify the positions of the leading end portions of various sheets 1 having different reflectances and the like.

Fourth Embodiment

FIGS. 15A to 17B are diagrams for describing a fourth embodiment of the present invention.

Figure 15A:
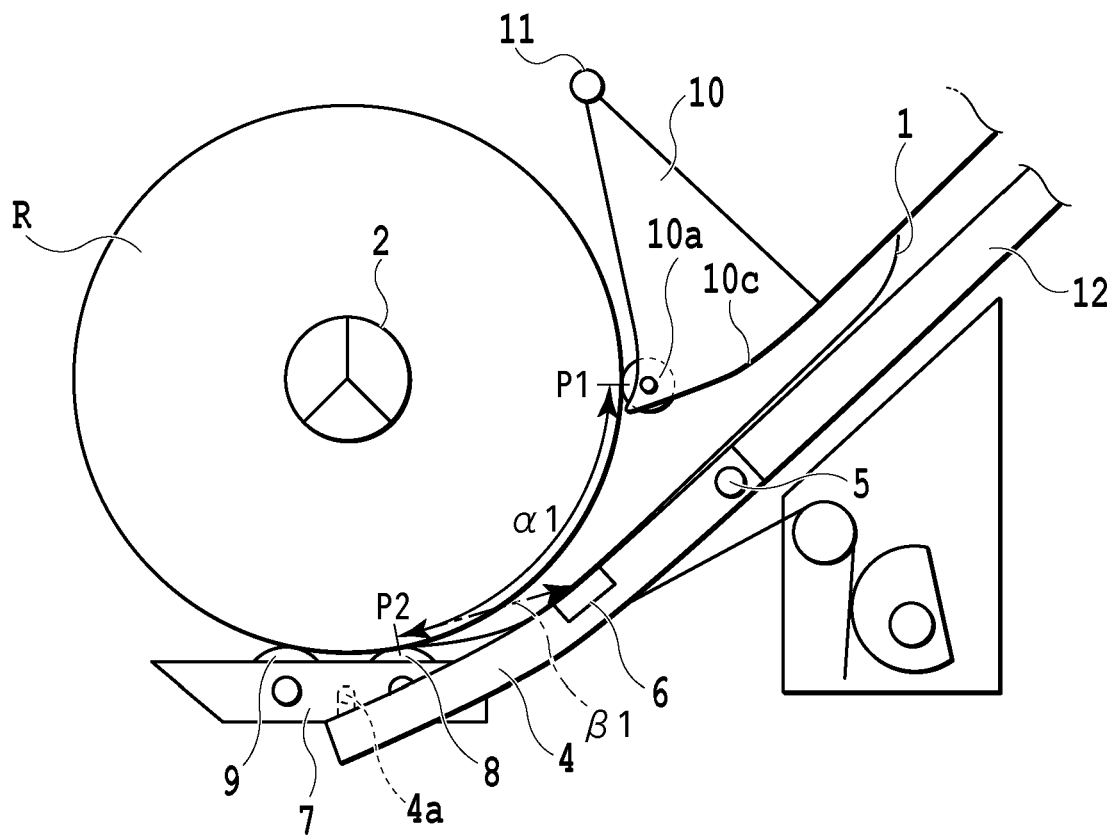
FIGS. 15A and 15B are explanatory diagrams of a deployment position of a sensor unit in a fourth embodiment of the present invention.
Figure 15B:
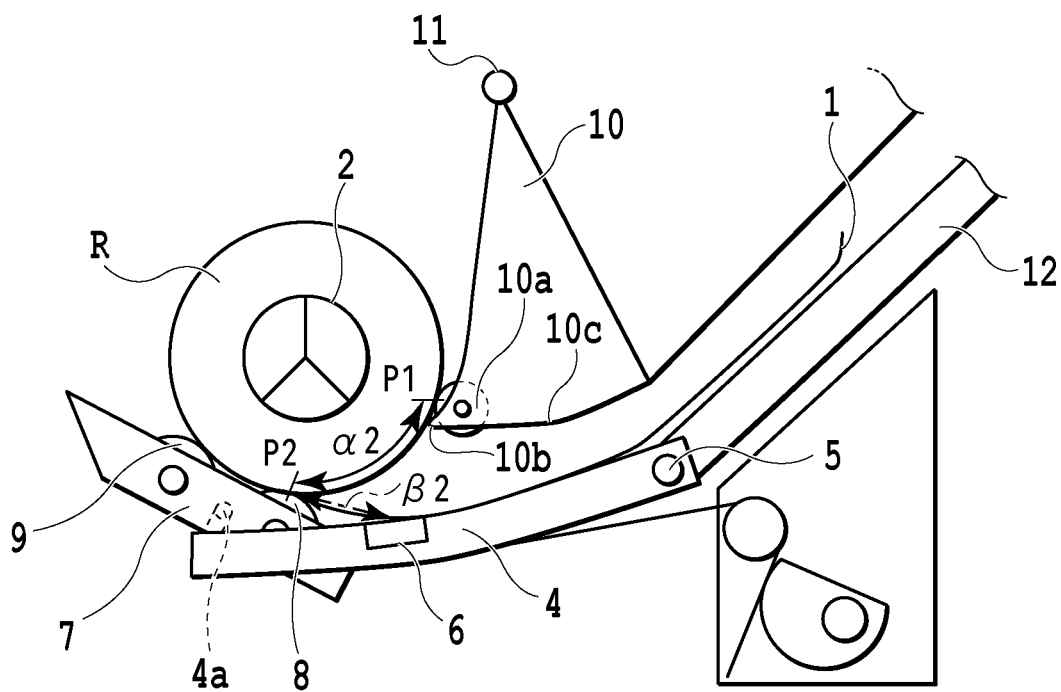

FIGS. 15A and 15B are diagrams for describing the position of the sensor unit 6 arranged in the arm member 4 of the sheet supplying apparatus 200, FIG. 15A illustrates an example in which the roll R having a large winding diameter is set, and FIG. 15B illustrates an example in which the roll R having a small winding diameter is set. In the present embodiment, the sensor unit 6 is provided to satisfy a position relation of Formula (1) irrespective of whether the winding diameter of the roll R is large or small as illustrated in FIG. 15A and FIG. 15B. In addition, when the roll R is configured such that the sheet 1 is wound around a pipe such as a paper pipe or the like, only the pipe such as the paper pipe is set, and even when the roll R has a minimum winding diameter, the position relation of Formula (1) below is held.

$$\alpha > \beta(\alpha 1 > \beta 1, \alpha 2 > \beta 2) \qquad (1)$$

A distance between a position P1 at which the roll R abuts on the separating flapper 10 (an abutting position of the upper guide on the roll R) and a position P2 at which the roll R abuts on the driving rotating body 8 (an abutting position of the lower guide on the roll) in FIG. 15A is indicated by α1. Further, a distance between the position P1 and the position P2 in FIG. 15B is indicated by α2. The distances α1 and α2 are referred to collectively as a "distance α". The detection position of the sensor unit 6 is a position of the detection portion of the sensor unit 6 that can detect the position of the leading end portion of the sheet 1 and corresponds, for example, to the position of the light emitting unit 6c and the light receiving unit 6d. A distance between the detection position of the sensor unit 6 and the position P2 in FIG. 15A is indicated by β1, and a distance between the detection position of the sensor unit 6 and the position P2 in FIG. 15B is indicated by β32. The distances β1 and β2 are referred to collectively as a "distance β".

The sensor unit 6 is installed at the position on the arm member 4 to satisfy a condition that the distance β1 is smaller than the distance α1 as illustrated in FIG. 15A, and the distance β2 is smaller than the distance α2 as illustrated in FIG. 15B. In other words, the sensor unit 6 is installed to satisfy the relation of α>β regardless of the winding diameter of the roll R.

Figure 16A:
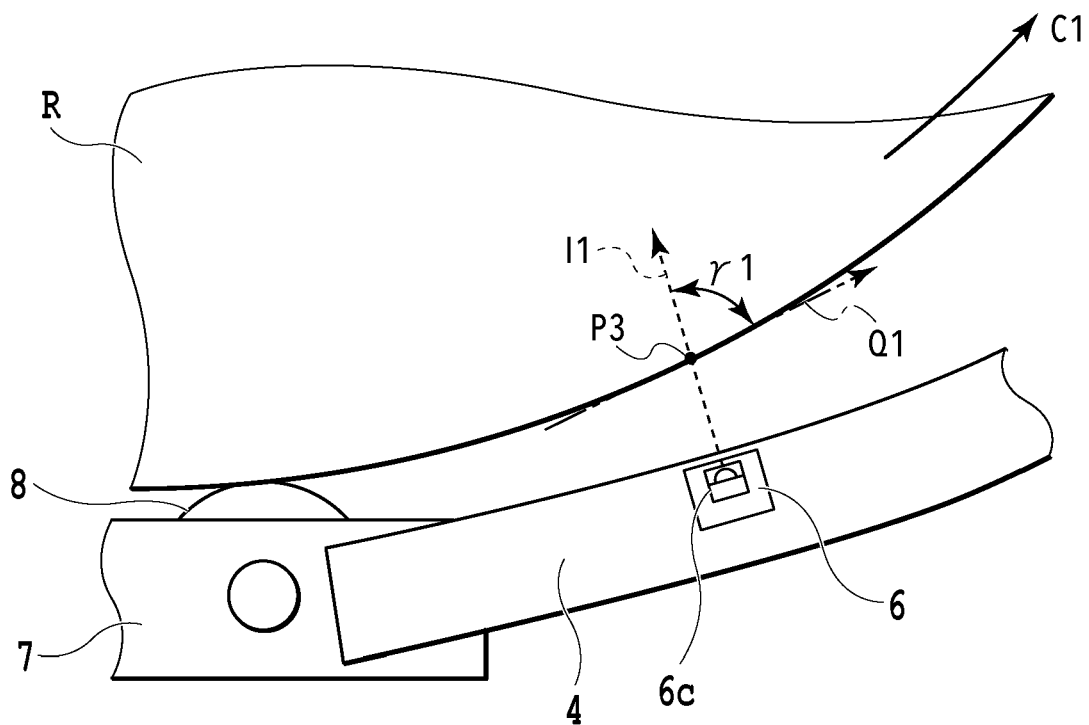
FIGS. 16A and 16B are explanatory diagrams of a relation between an optical axis of the sensor unit and an outer circumferential surface of a roll.
Figure 16B:
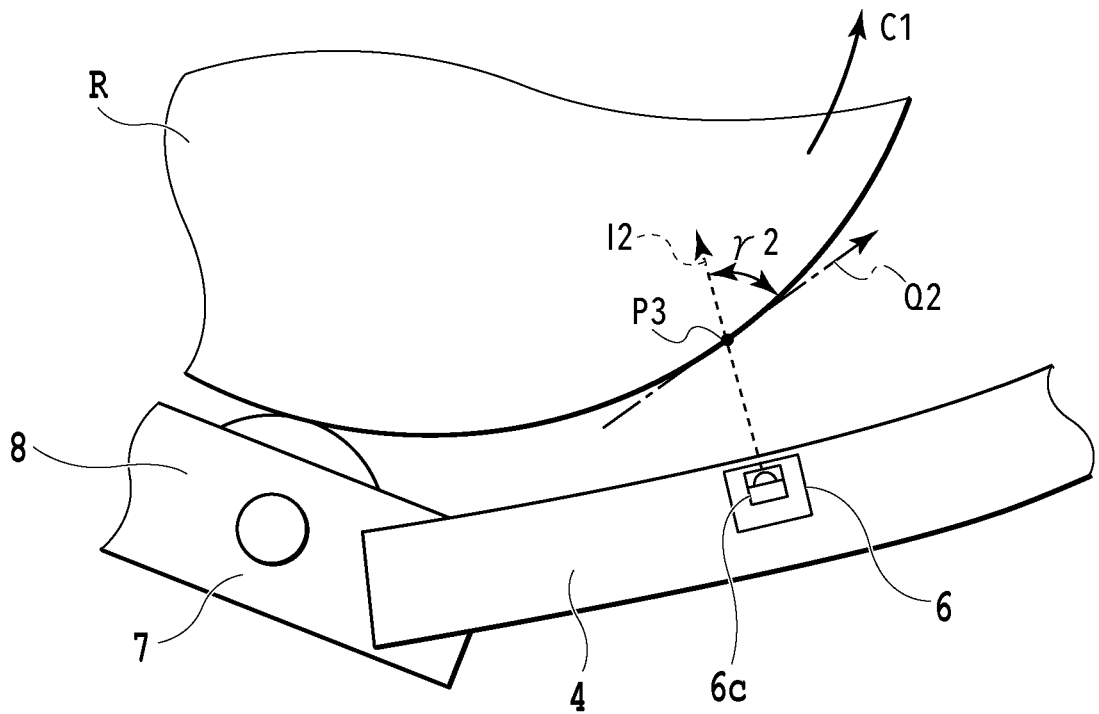

FIGS. 16A and 16B are explanatory diagrams of the light emission optical axis of the light emitting unit 6c in the sensor unit 6, FIG. 16A illustrates an example in which the roll R having a large winding diameter is set, and FIG. 16B illustrates an example in which the roll R having a small winding diameter is set. Both of an angle γ1 between a light emission optical axis I1 of the light emitting unit 6c and a vector Q1 in FIG. 16A and an angle γ2 between a light emission optical axis I2 of the light emitting unit 6c and a vector Q2 in FIG. 16B satisfy a relation of Formula (2).

$$0° < \gamma(\gamma 1, \gamma 2) < 90° \qquad (2)$$

The vector Q1 is a vector facing in the normal rotation direction of the roll R (the direction of arrow C1) along a tangent line at a crossing point P3 between the optical axis I1 and the roll R. Similarly, the vector Q2 is a vector facing in the normal rotation direction of the roll R along a tangent line at a crossing point P3 between the optical axis I2 and the roll R. The optical axes I1 and I2 are referred to collectively as an "optical axis I", the vectors Q1 and Q2 are referred to collectively as a vector "Q", and the angles γ1 and γ2 are referred to as collectively an "angle γ".

As described above, the sensor unit 6 is arranged so that the angle γ (γ1 and γ2) between an imaginary line obtained by extending the optical axis I (I1, I2) to the inside of the roll R and the vector Q (Q1, Q2) is an acute angle.

Figure 17A:
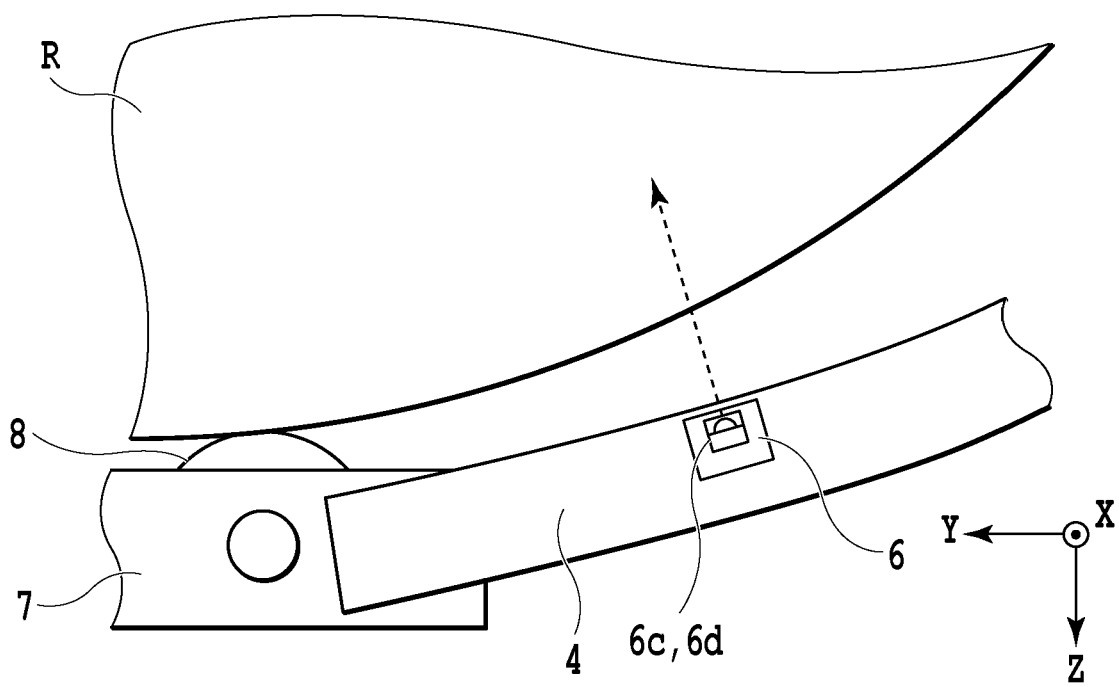
FIGS. 17A and 17B are explanatory diagrams of a configuration of the sensor unit.
Figure 17B:
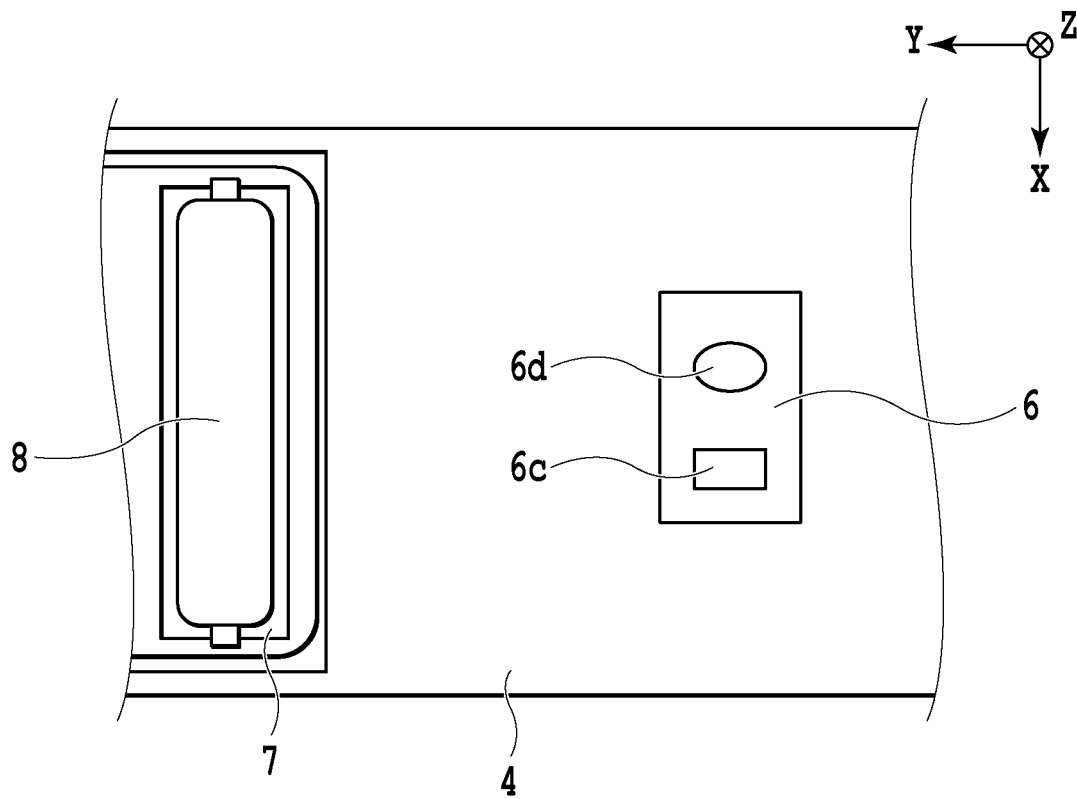

FIGS. 17A and 17B are explanatory diagrams of an arrangement relation between the light emitting unit 6c and the light receiving unit 6d in the sensor unit 6. FIG. 17A is a diagram of a main part of the sheet supplying apparatus 200 viewed in the X-axis direction, and FIG. 17B is a diagram of the main part viewed in the Z-axis direction.

In the present embodiment, the light emitting unit 6c and the light receiving unit 6d are arranged side by side in the axis direction of the roll R (the X-axis direction). As the light emitting unit 6c and the light receiving unit 6d are arranged side by side in the axis direction of the roll R, the light emission optical axis of the light emitting unit 6c and a light reception optical axis of the light receiving unit 6d substantially face each other in the axis direction of the roll R. As the light emitting unit 6c and the light receiving unit 6d are arranged as described above, the distance between the leading end portion of the sheet 1 and the sensor unit 6 can be detected irrespective of whether the winding diameter of the roll R is large or small. In other words, the leading end portion of the sheet 1 can be detected when the leading end portion of the sheet 1 passes through the driven roller 10a of the separating flapper 10 with the reverse rotation of the roll R and then falls on the arm member 4 by its own weight.

Further, since the angle γ is set to the acute angle, a state in which a right angle is formed between the light emission optical axis I and the front surface of the leading end portion of the sheet 1 exists until the leading end portion of the sheet 1 passes over the sensor unit 6 after the leading end portion of the sheet 1 falls on the arm member 4 due to its own weight with the reverse rotation of the roll R. In the state of the right angle, the reflection light which is irradiated from the light emitting unit 6c and reflected by the leading end portion of the sheet 1 is detected by the light receiving unit 6d as the strongest regular reflection light. Further, as the angle between the front surface of the arm member 4 on which the leading end portion of the sheet 1 falls and the light emission optical axis I is set to 90°, when the leading end portion of the sheet 1 becomes a shape along the arm member 4, the light emission optical axis I and the front surface of the leading end portion of the sheet 1 form the right angle.

As described above, there is a state in which the light receiving unit 6d receives the strongest regular reflection light until the leading end portion of the sheet 1 passes over the sensor unit 6 after it falls on the arm member 4 due to its own weight. Therefore, when the leading end portion of the sheet 1 falls on the arm member 4 due to its own weight, the sensor output of the sensor unit 6 becomes the H level with a high degree of certainty, and it is possible to acquire the sensor output necessary for specifying the position of the leading end portion of the sheet 1 with a high degree of certainty.

Further, the light emitting unit 6c and the light receiving unit 6d are arranged side by side in the axis direction of the roll R so that the light emission optical axis and the light reception optical axis are caused to face each other substantially. Accordingly, it is possible to reduce or suppress influence of a type of sheet 1, the change in the winding diameter of the roll R, the change in the behavior of the leading end portion of the sheet 1, or the like on the sensor output. Further, in a series of sensor outputs, it is possible to reduce or suppress noise caused by external light by increasing a ratio of the sensor output when the light receiving unit 6d receives the regular reflection light. In a case in which the relations of Formulas (1) and (2) are not satisfied, and α<β and γ>90° are satisfied, the optical axes of the sensor unit 6 face the separating flapper 10, and the sensor output according to the interval with the leading end portion of the sheet 1 is unable to be acquired.

The position at which the sensor unit 6 is provided is not limited to the arm member 4 but may be provided at a position other than the arm member 4 in view of optical characteristics of the sensor unit 6 or the like.

Fifth Embodiment

Figure 18A:
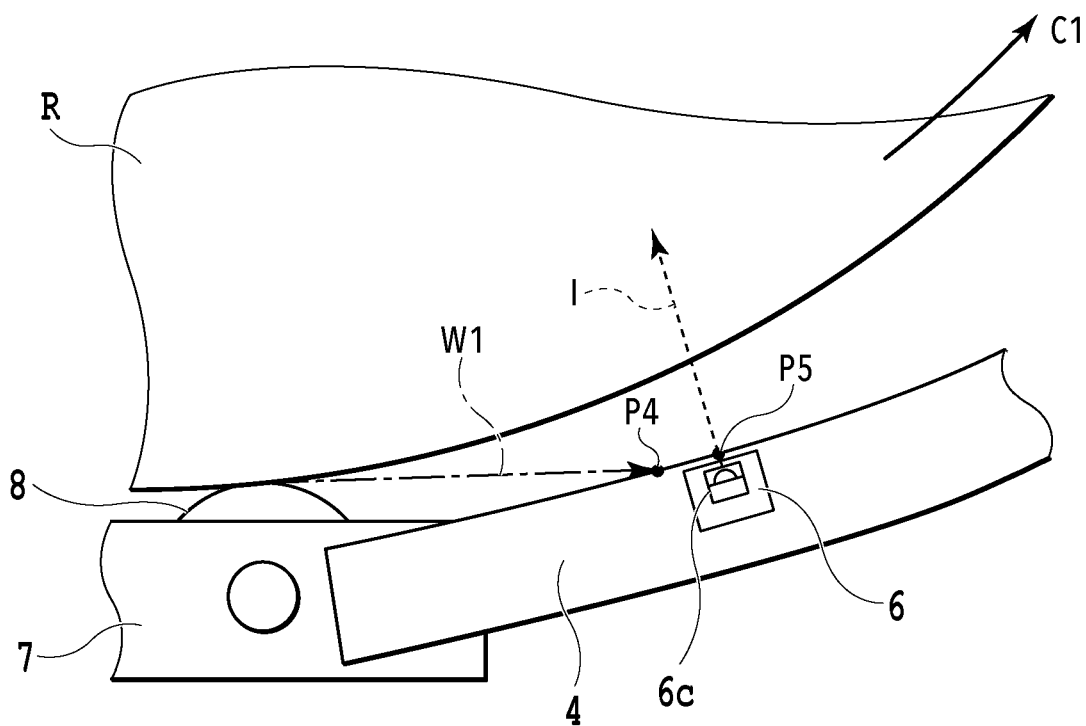
FIGS. 18A and 18B are explanatory diagrams of a deployment position of a sensor unit in a fifth embodiment of the present invention.
Figure 18B:
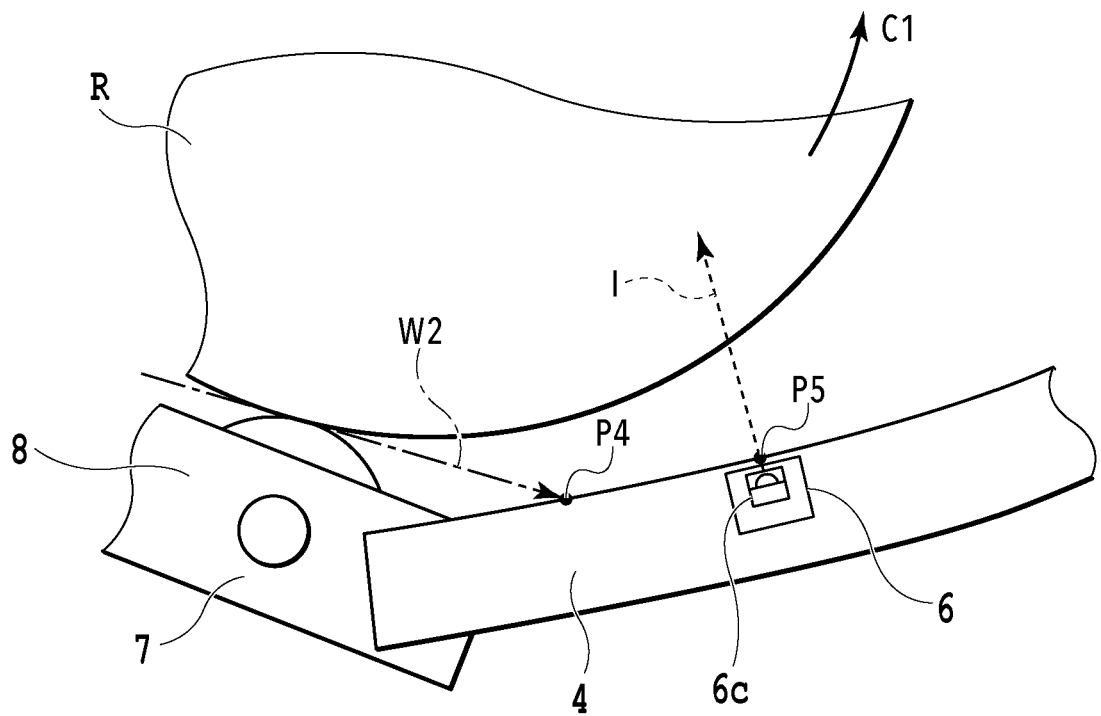

FIGS. 18A and 18B are explanatory diagrams of a configuration of the sheet supplying apparatus 200 in a fifth embodiment of the present invention. FIG. 18A illustrates a state in which the roll R with a large winding diameter is set, and FIG. 18B illustrates a state in which the roll R with a small winding diameter is set.

In the present embodiment, a relation between the arm member 4 and a vector W (W1, W2) facing in the normal rotation direction of the roll R along a tangent line at a contact point between the roll R and the driving rotating body 8 is specified. In other words, the supplying apparatus 200 is configured so that there is a crossing point P4 between the vector W (W1, W2) and the front surface of the arm member 4 regardless of whether the winding diameter of the roll R is large or small. Further, the crossing point P4 is positioned on an upstream side of the sheet 1 (the left side in FIGS. 18A and 18B) in the conveyance direction further than a crossing point P5 of the light emission optical axis I of the sensor unit 6 and the front surface of the arm member 4.

As the supplying apparatus 200 is configured as described above, when the sheet 1 is conveyed with the normal rotation of the roll R in the direction of arrow C1, the leading end portion of the sheet 1 moves toward the arm member 4 along the vector W. Therefore, the leading end portion of the sheet 1 is conveyed while coming into contact with the arm member 4 regardless of whether the winding diameter of the roll R is large or small. Further, since the crossing point P4 is positioned on the upstream side in the conveyance direction further than the crossing point P5, the leading end portion of the sheet 1 passes over the sensor unit 6 in the conveyance process of the leading end portion of the sheet 1 regardless of whether the winding diameter of the roll R is large or small. Therefore, the sensor unit 6 can reliably detect the interval with the leading end portion of the sheet 1 regardless of whether the winding diameter of the roll R is large or small.

Sixth Embodiment

Figure 19A:
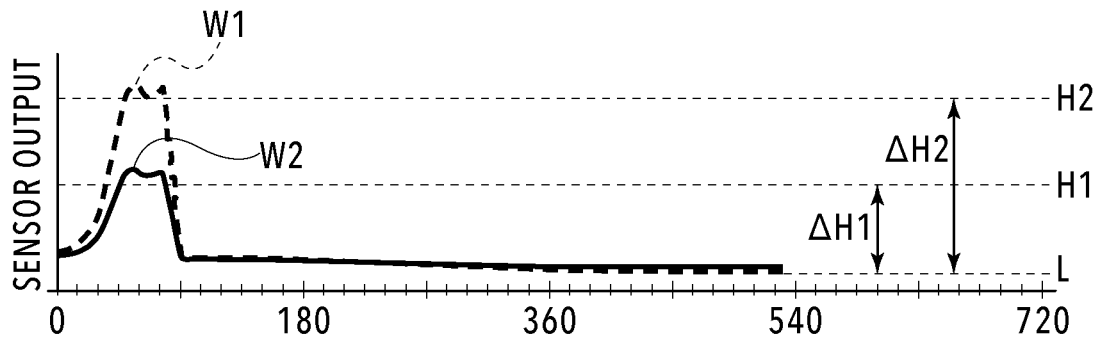
FIGS. 19A, 19B, and 19C are explanatory diagrams of a relation between an output of a sensor unit and a position of a leading end portion of a sheet in a sixth embodiment of the present invention.
Figure 19B:
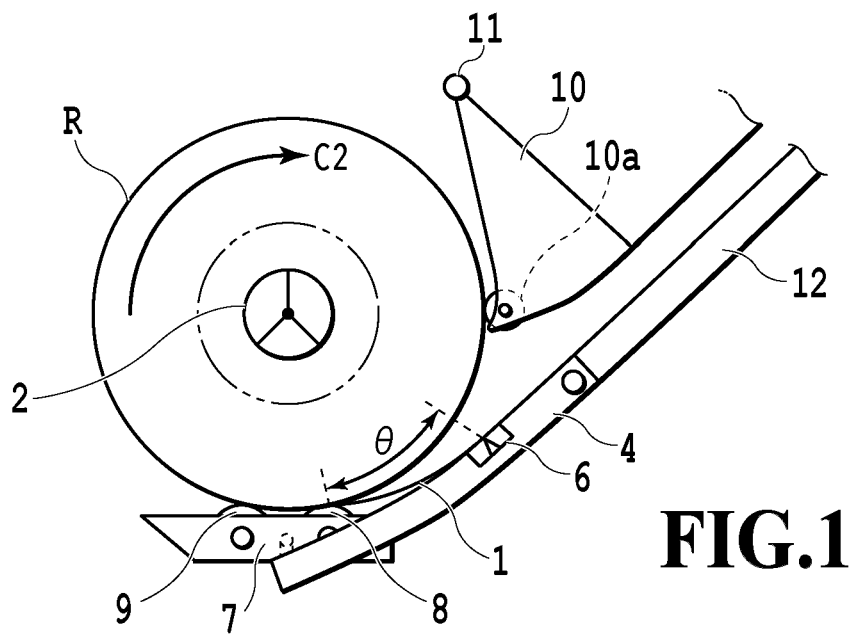
Figure 19C:
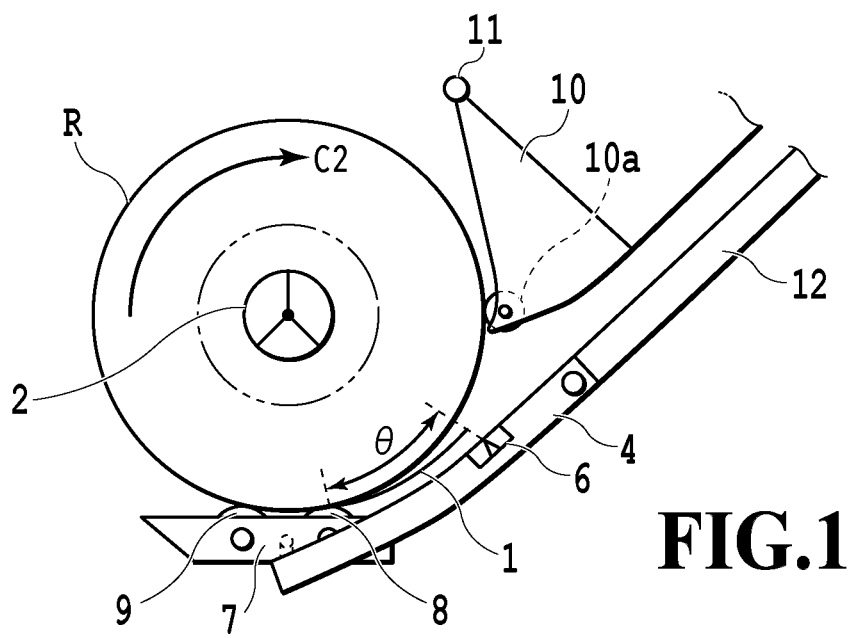
Figure 20A:
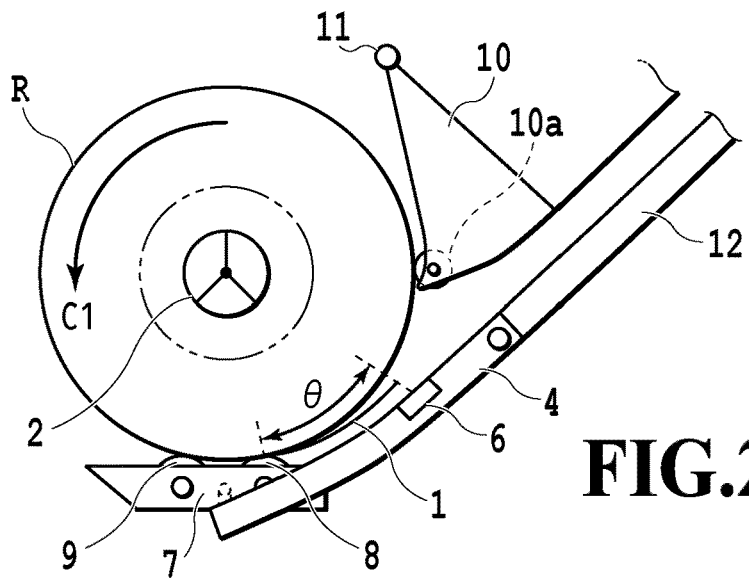
FIGS. 20A, 20B, and 20C are explanatory diagrams of a behavior of the leading end portion of the sheet.
Figure 20B:
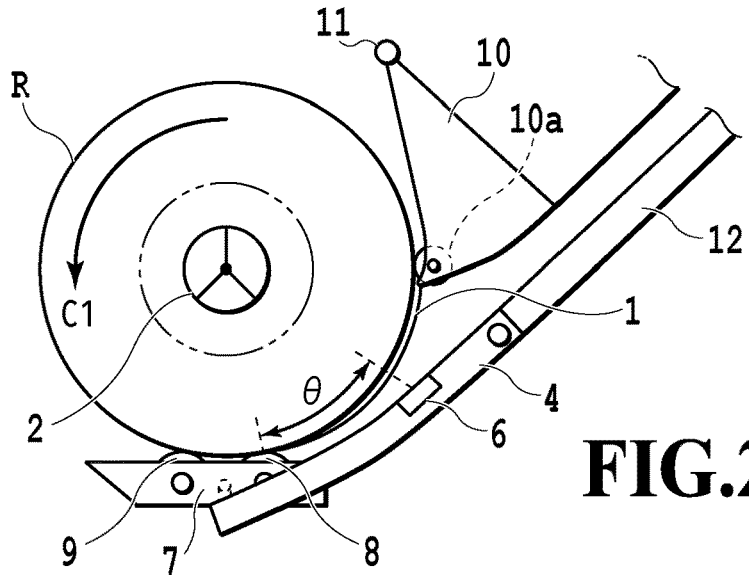
Figure 20C:
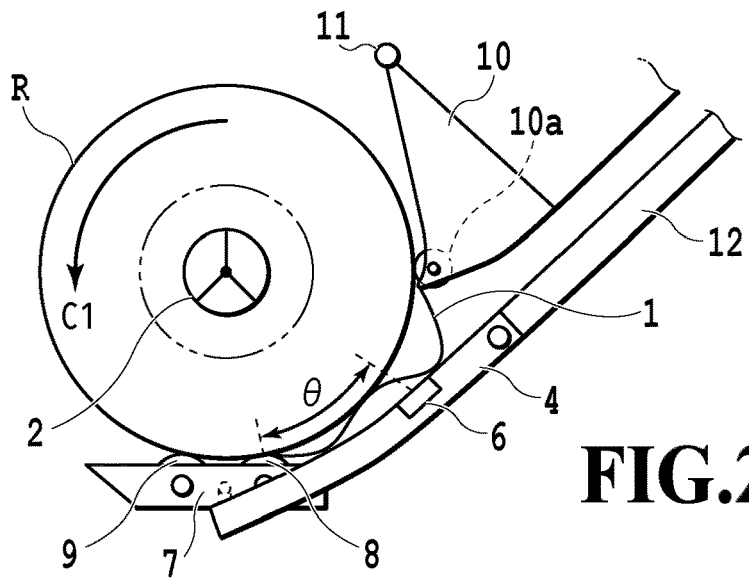
Figure 21:
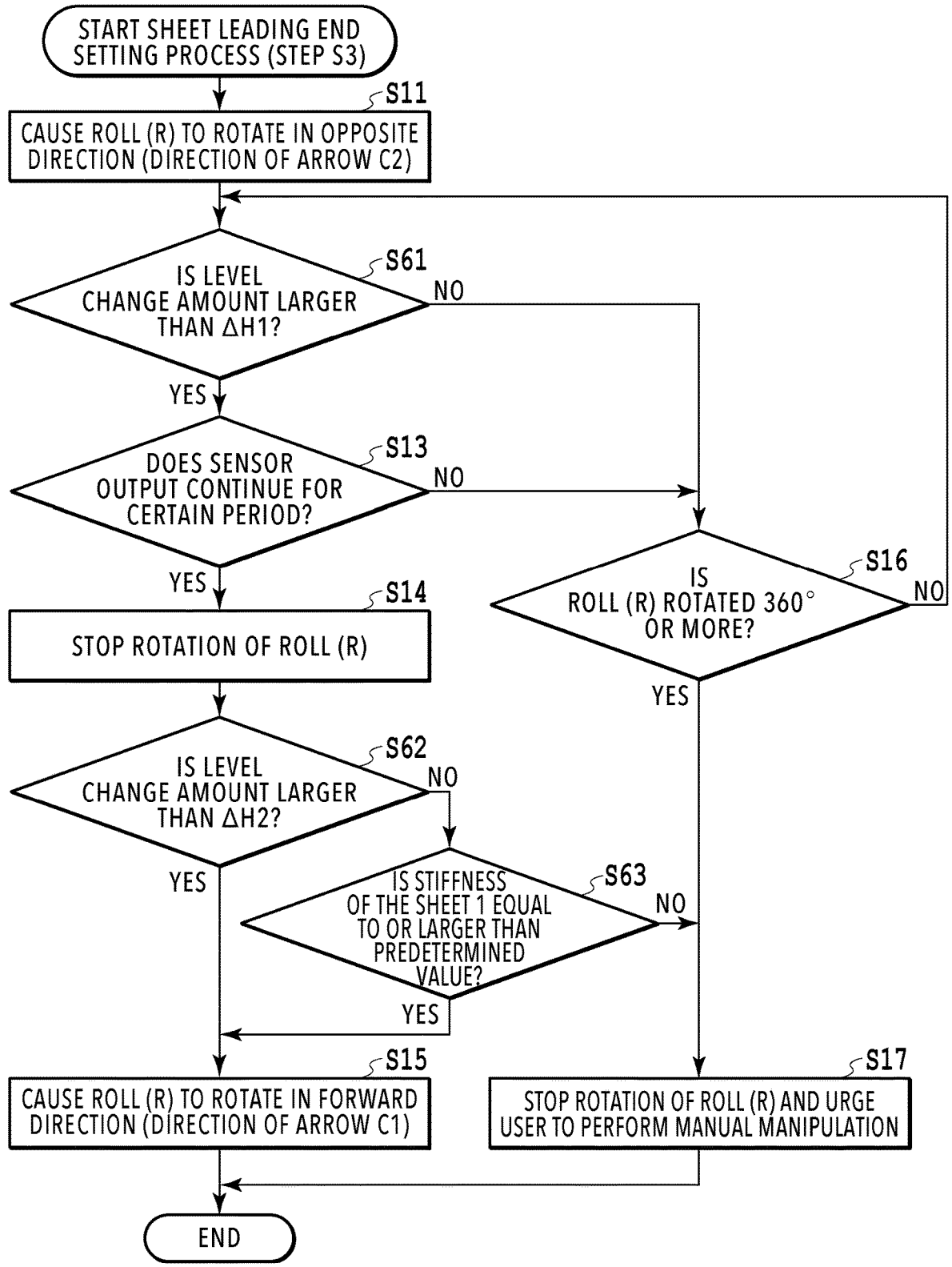
FIG. 21 is a flowchart for describing a sheet leading end setting process.

FIGS. 19A to 21 are explanatory diagrams of a sixth embodiment of the present invention. FIG. 19A is an explanatory diagram of an output waveform of the sensor unit 6. FIG. 19B is an explanatory diagram of a state in which the leading end portion of the sheet 1 is appropriately separated from the outer circumferential surface of the roll R, and FIG. 19C is an explanatory diagram of a state in which the separation amount of the leading end portion of the sheet 1 from the outer circumferential surface of the roll R is small due to an influence of static electricity or the like. FIG. 20A, FIG. 20B, and FIG. 20C are explanatory diagrams when the roll R is normally rotated in the direction of arrow C1 in the state of FIG. 19C. FIG. 21 is a flowchart for describing a sheet leading end setting process (automatic loading) in the present embodiment.

As illustrated in FIG. 19B, when the leading end portion of the sheet 1 is appropriately separated from the outer circumferential surface of the roll R, the sensor output of the sensor unit 6 changes as in a waveform W1 in FIG. 19A. In other words, in a state in which the leading end portion of the sheet 1 is nearby the driven roller 10a, the reverse rotation of the roll R in the direction of arrow C2 starts, and when the roll R rotates about 45°, the leading end portion of the sheet 1 passes through the driven roller 10a and falls. Accordingly, the sensor output changes from the L level to an H2 level. Further, when the roll R rotates about 90° after the rotation starts, the sensor output changes from the H level to the L level as the leading end portion of the sheet 1 passes over the sensor unit 6 as illustrated in FIG. 19B. Thereafter, as the roll R is normally rotated in the direction of arrow C1, the leading end portion of the sheet 1 can be automatically inserted into the sheet supply path and fed.

On the other hand, when the separation amount of the leading end portion of the sheet 1 is small as illustrated in FIG. 19C, the sensor output of the sensor unit 6 changes as in a waveform W2 in FIG. 19A. In other words, in the state in which the leading end portion of the sheet 1 is nearby the driven roller 10a, the reverse rotation of the roll R in the direction of arrow C2 is started, and when the roll R rotates about 45°, the leading end portion of the sheet 1 passes through the driven roller 10a and falls. Further, when the roll R rotates about 90° after the rotation starts, the sensor output changes from the H level to the L level as the leading end portion of the sheet 1 passes over the sensor unit 6 as illustrated in FIG. 19C. Thereafter, when the roll R is normally rotated in the direction of arrow C1, as the separation amount of the leading end portion of the sheet 1 is small as illustrated in FIG. 20A, the leading end portion of the sheet 1 is likely to collide with the driven roller 10a as illustrated in FIG. 20B, and the sheet 1 is likely to jam as illustrated in FIG. 20C. FIG. 20A illustrates a state in which the leading end portion of the sheet 1 is separated. FIG. 20B illustrates a state in which the leading end portion of the sheet 1 collides with the driven roller 10a. FIG. 20C illustrates a state in which the sheet 1 jams.

FIG. 21 is a flowchart of a sheet leading end setting process (automatic loading) in the present embodiment. Processes similar to those in the flowchart of FIG. 8 of the first embodiment are denoted by the same step numbers, and description thereof will be omitted.

The CPU 201 determines whether the roll R is set or not (step S1 in FIG. 6). After the roll R is set, the CPU 201 switches a state in which the arm member 4 is pressed in the direction of the arrow A1 by "strong pressing force" (a strong nip state) (step S2 in FIG. 6).

In the sheet leading end setting process, the CPU 201 causes the roll R to rotate once or more in the opposite direction of arrow C2 (reversely rotated) (step S11).

At the time of the reverse rotation of the roll R, the CPU 201 obtains a change amount (level change amount) when the sensor output of the sensor unit 6 changes from the H level to the L level, and determines whether or not the level change amount exceeds a predetermined threshold value ΔH1 (=H1−L) (step S61). When the level change amount is not larger than the predetermined threshold value ΔH1 (=H1−L) even though the roll R performs one or more reverse rotations, the leading end portion of the sheet 1 is determined not to be separated from the outer circumferential surface of the roll R, and the process proceeds to step S17. In step S17, the user is urged to perform a manual manipulation of inserting the leading end portion of the sheet 1 into the sheet supply path. Therefore, the threshold value ΔH1 is a criterion for determining whether or not the leading end portion of the sheet 1 is separated from the outer circumferential surface of the roll R. In FIG. 19A, L indicates the lowest level of the sensor output.

When the level change amount of the sensor output is larger than the threshold value ΔH1, the CPU 201 determines that the leading end portion of the sheet 1 is separated from the outer circumferential surface of the roll R as illustrated in FIG. 19B or FIG. 19C. Then, the rotation of the roll R is caused to be stopped when the L level of the sensor output continues for a certain period (steps S13 and S14). Thereafter, the CPU 201 determines whether or not the level change amount of the sensor output is larger than a predetermined threshold value ΔH2 (=H2−L) (step S62). When the level change amount is larger than the threshold value ΔH2, the leading end portion of the sheet 1 is determined to be appropriately separated from the outer circumferential surface of the roll R as illustrated in FIG. 19B, and the automatic loading is executed (step S15). On the other hand, when the level change amount is not larger than the threshold value ΔH2, the separation amount of the leading end portion of the sheet 1 from the outer circumferential surface of the roll R is determined to be small as illustrated in FIG. 19C. Then, it is determined whether or not stiffness of the sheet 1 is equal to or larger than a predetermined value (step S63). The stiffness of the sheet 1 is determined, for example, on the basis of information related to a type of sheet 1 input by the user. A criterion for determining the stiffness of the sheet 1 may be set in accordance with a width size of the sheet 1, a use state of the sheet 1, a use environment of the printing apparatus, or the like in addition to the information related to the type of sheet 1. When the stiffness of the sheet 1 is equal to or larger than a predetermined value, the process proceeds to step S15, and the automatic loading is executed. On the other hand, when the stiffness of the sheet 1 is less than the predetermined value, the process proceeds to step S17, and the user is urged to perform the manual manipulation of inserting the leading end portion of the sheet 1 into the sheet supply path.

As described above, the separation amount of the leading end portion of the sheet 1 is detected on the basis of the sensor output of the sensor unit 6, and the automatic loading is executed when the separation amount and the stiffness of the sheet 1 satisfy predetermined conditions. Accordingly, it is possible to prevent the sheet 1 from jamming in the printing apparatus.

Seventh Embodiment

Figure 22:
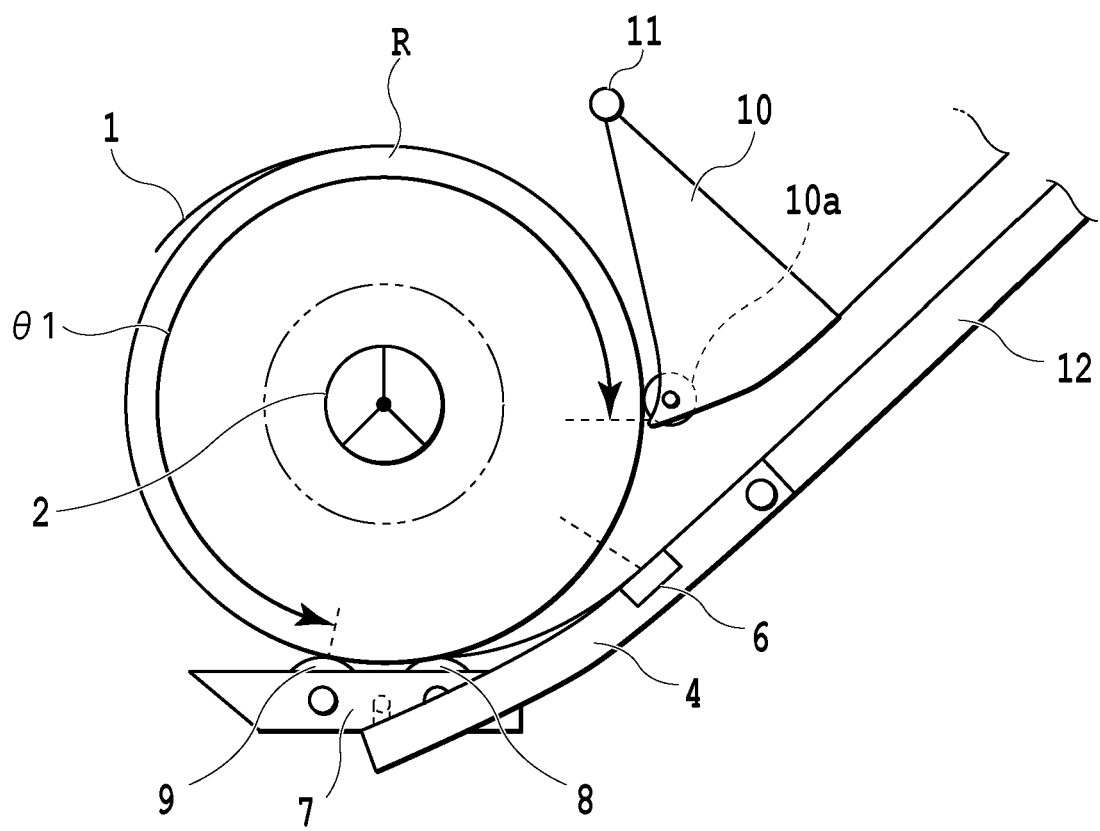
FIG. 22 is an explanatory diagram of a stop position of a leading end portion of a sheet in a seventh embodiment of the present invention.
Figure 23:
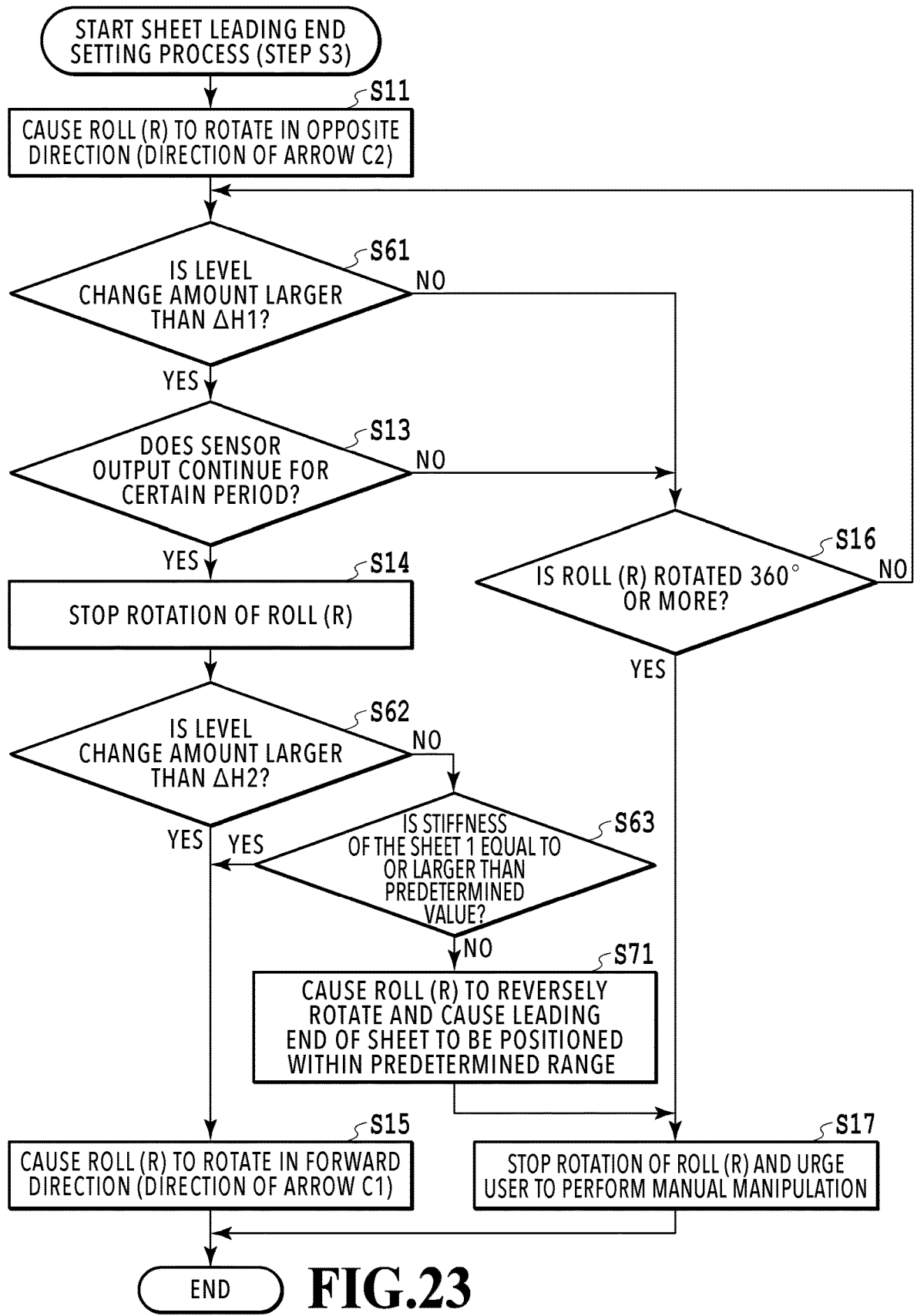
FIG. 23 is a flowchart for describing a sheet leading end setting process.

FIGS. 22 and 23 are explanatory diagrams of a seventh embodiment of the present invention. In the present embodiment, when the leading end portion of the sheet 1 is not automatically fed into the sheet supply path, that is, when the automatic loading is unable to be performed, the leading end portion of the sheet 1 is positioned within a predetermined range for manual sheet feeding. FIG. 22 is an explanatory diagram of a stop position of the leading end portion of the sheet 1, and FIG. 23 is a flowchart for describing a sheet leading end setting process (automatic loading) in the present embodiment.

When the leading end portion of the sheet 1 is not automatically fed into the sheet supply path, the roll R is caused to reversely rotate in the direction of arrow C2 so that the leading end portion of the sheet 1 is positioned within a range θ1 between the driven roller 10a and the driving rotating body 9 (within a viewable range) as illustrated in FIG. 22. The range θ1 includes a range of a peripheral surface of the roll R visible by the user when the roll R is attached to or detached from the printing apparatus. As the leading end portion of the sheet 1 is positioned within the range θ1, workability of the manual manipulation in which the user visually recognizes the leading end portion of the sheet 1 and inserts the leading end portion of the sheet 1 into the sheet supply path is improved.

In the sheet leading end setting process of the present embodiment, an operation for stopping the leading end portion of the sheet 1 at a position within the predetermined range θ1 (step S71) is added as illustrated in FIG. 23. When the stiffness of the sheet 1 is less than the predetermined value in step S63, the CPU 201 causes the roll R to reversely rotate in the direction of arrow C2 so that the leading end portion of the sheet 1 is positioned within the range θ1. Thereafter, the process proceeds to step S17, and the user is urged to perform the manual manipulation of inserting the leading end portion of the sheet 1 into the sheet supply path.

As described above, as the leading end portion of the sheet 1 is positioned within the predetermined range in which the user can view, the visibility of the leading end portion of the sheet 1 by the user can be improved. Further, when the user's attention is invited by display of a panel or the like, the user can smoothly insert the leading end portion of the sheet 1 into the sheet supply path. Accordingly, the user can easily perform the manual sheet feeding.

In the present example, from the viewpoint of the visibility of the leading end portion of the sheet 1 by the user, the stop position of the leading end portion of the sheet 1 is decided within the range θ1 between the driven roller 10a and the driving rotating body 9 as illustrated in FIG. 22. However, for example, in order to reduce the rotation amount of the roll R and reduce a period of time required for the manual manipulation of inserting the leading end portion of the sheet 1, the leading end portion of the sheet 1 may be stopped within a range between the driven roller 10a and the driving rotating body 9 which is different from the range θ1.

Modified Example

As the sensor unit 6, a distance sensor other than an optical sensor can be used as long as a sensor has an output value changing according to a distance to the sheet. For example, a distance sensor such as an ultrasonic sensor or an electrostatic sensor that detects the distance to the object in a non-contact manner can be used.

The printing apparatus is not limited to the configuration including the two sheet supplying apparatuses corresponding to the two roll sheets and may be a configuration including one sheet supplying apparatus or three or more sheet supplying apparatuses. Further, the printing apparatus is not limited to only the inkjet printing apparatus as long as an image can be printed on a sheet supplied from the sheet supplying apparatus. Further, the printing system and configuration of the printing apparatus are arbitrary as well. For example, a serial scan system of repeating scanning of the print head and the sheet conveyance operation to print an image or a full-line system of continuously conveying a sheet to a position opposite to a long print head to pant an image may be employed.

Further, the present invention can be applied to various sheet supplying apparatuses in addition to the sheet supplying apparatus which supplies sheets serving as print medium to the printing apparatus. For example, the present invention can be applied to an apparatus that supplies a reading target sheet to a reading apparatus such as a scanner or a copying machine, and an apparatus that supplies a sheet-like processing material to a processing apparatus such as a cutting apparatus. Such a sheet supplying apparatus may be configured separately from an apparatus such as the printing apparatus, the reading apparatus, or the processing apparatus and may include a control unit (CPU) for the sheet supplying apparatus.

Figure 24A:
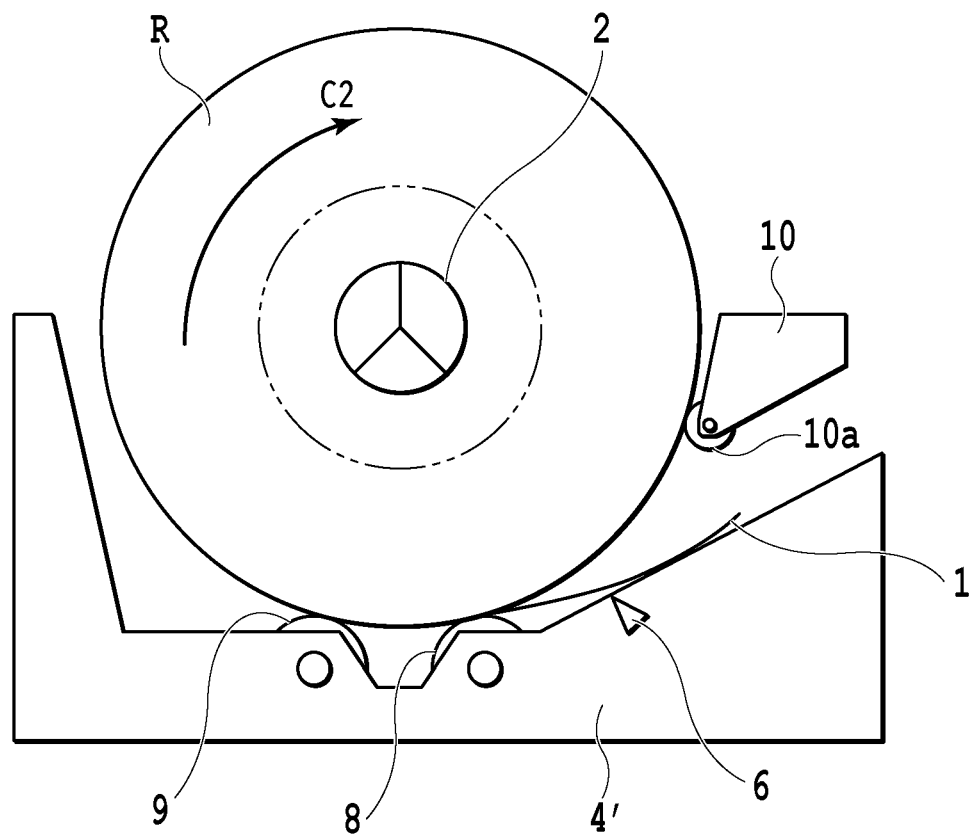
FIGS. 24A and 24B are explanatory diagrams of another configuration example of a sheet supplying apparatus.
Figure 24B:
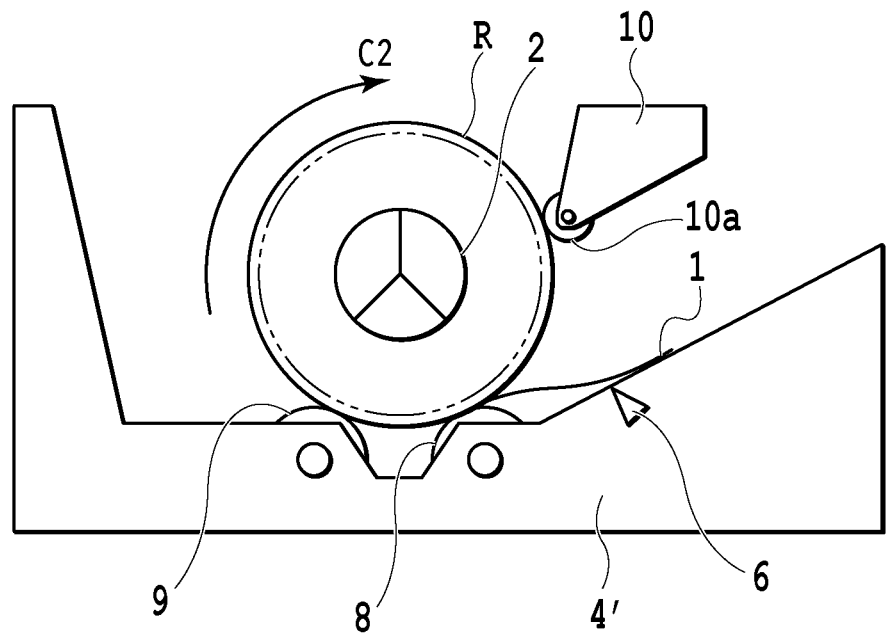

The sheet supplying apparatus may be configured such that the driving rotating bodies 8 and 9 and the sensor unit 6 are arranged on a fixed structure 4' provided on the lower side of the roll R, and the roll R comes into pressure contact with the driving rotating bodies 8 and 9 due to its own weight of the roll R regardless of the winding diameter of the roll R as illustrated in FIGS. 24A and 24B. Further, the roll R may be brought into pressure contact with the driving rotating bodies 8 and 9 using a driving mechanism (not illustrated).

The present invention can be widely applied to a supplying apparatus that supplies various sheets including paper, a film, cloth, and the like, and to various sheet processing apparatuses such as a printing apparatus and an image scanning apparatus including such a supplying apparatus. The image scanning apparatus scans an image of a sheet supplied from the supplying apparatus by a scanning head. Further, the sheet processing apparatus is not limited to only the printing apparatus and the image scanning apparatus as long as various processes (processing, coating, irradiation, inspection, and the like) can be performed on the sheet supplied from the supplying apparatus. In a case in which the sheet supplying apparatus is configured as an independent apparatus, the apparatus can be equipped with a control unit including a CPU. In a case in which the sheet supplying apparatus is installed in the sheet processing apparatus, at least one of the supplying apparatus and the sheet processing apparatus can be equipped with a control unit including a CPU.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-046414 filed Mar. 10, 2017, which is hereby incorporated by reference herein in its entirety.

What is claimed is:

1. A printing apparatus, comprising:
   a holding unit configured to hold a roll sheet with a continuous sheet wound in a roll form;
   a printing unit configured to perform printing on the sheet supplied from the holding unit;
   a driving unit configured to rotate the roll sheet held in the holding unit in a forward direction for supplying the sheet to the printing unit and in an opposite direction opposite to the forward direction;
   a first pressing body configured to press the roll sheet held in the holding unit;
   a guide configured to hold the first pressing body and guide a lower surface of the sheet supplied from the holding unit;
   a sensor disposed on the guide and configured to change an output in accordance with a distance to an outer circumferential surface of the roll sheet held in the holding unit, the sensor being disposed on a upstream side of the first pressing member with respect to the opposite direction; and
   a control unit configured to control the driving unit, the control unit controlling the driving unit so as to rotate the roll sheet in the opposite direction, and to switch a rotation direction of the roll sheet from the opposite direction to the forward direction on the basis of the output of the sensor during the rotation of the roll sheet in the opposite direction.

2. The printing apparatus according to claim 1, wherein the control unit controls the driving unit so as to switch the rotation direction of the roll sheet from the opposite direction to the forward direction in a case where the distance between the sensor and the outer circumferential surface of the roll sheet is estimated to be equal to or less than a predetermined value on the basis of the output of the sensor while the roll sheet is rotated in the opposite direction by the driving unit.

3. The printing apparatus according to claim 1, wherein the control unit controls the driving unit so as to switch the rotation direction of the roll sheet from the second opposite direction to the forward direction in a case where the distance between the sensor and the outer circumferential surface of the roll sheet is estimated to be equal to or less than a predetermined value and then increase on the basis of the output of the sensor while the roll sheet is rotated in the opposite direction by the driving unit.

4. The printing apparatus according to claim 1, wherein in a case where a leading end portion of the roll sheet rotated in the opposite direction passes through a contact position with the first pressing body, the first pressing body allows the leading end portion to be separated from the outer circumferential surface, and the sensor is disposed at a position which the leading end portion of the sheet separated from the outer circumferential surface approaches.

5. The printing apparatus according to claim 1, wherein the sensor is an optical sensor including a light emitting unit and a light receiving unit, and an angle formed between an imaginary line and a tangent line is an acute angle, the imaginary line being obtained by extending a light emission optical axis of the light emitting unit to an inside of the roll sheet, the tangent line facing in the forward direction at a crossing point between the light emission optical axis and the outer circumference surface.

6. The printing apparatus according to claim 1, wherein the sensor is an optical sensor including a light emitting unit and a light receiving unit, and the light emitting unit and the light receiving unit are positioned to be shifted in a direction of a rotational shaft of the roll sheet.

7. The printing apparatus according to claim 1, further comprising an adjusting unit configured to adjust detection sensitivity of the sensor on the basis of the output of the sensor during rotation of the roll sheet in the opposite direction.

8. The printing apparatus according to claim 7, wherein the sensor is an optical sensor including a light emitting unit and a light receiving unit, and the adjusting unit adjusts at least one of light reception sensitivity of the light receiving unit and light emission strength of the light emitting unit.

9. The printing apparatus according to claim 1, wherein, in a case where the output of the sensor does not change and exceed a predetermined range while the roll sheet rotates in the opposite direction by a predetermined amount, the control unit stops the driving unit.

10. The printing apparatus according to claim 1, wherein, in a case where the output of the sensor does not change and exceed a predetermined range while the roll sheet rotates in the opposite direction by a predetermined amount, the control unit controls the driving unit so as to rotate the roll sheet in the opposite direction until a leading end portion of the roll sheet moves to a position visible by a user and then stops the driving unit.

11. The printing apparatus according to claim 1, further comprising a notifying unit configured to give a notification for urging a user to manually set a leading end portion of the roll sheet in a case where the output of the sensor does not change and exceed a predetermined range while the roll sheet rotates in the opposite direction by a predetermined amount.

12. The printing apparatus according to claim 1, further comprising a second pressing body configured to press the roll sheet held in the holding unit, the second pressing body being disposed on a upstream side of the sensor with respect to the opposite direction.

13. The printing apparatus according to claim 12, wherein in a case where a leading end portion of the roll sheet rotated in the opposite direction passes through a contact position with the second pressing body, the first pressing body allows the leading end portion to be separated from the outer circumferential surface.

14. The printing apparatus according to claim 13, wherein in a case where the leading end portion of the roll sheet rotated in the opposite direction passes through the contact position with the first pressing body, the first pressing body allows the leading end portion to be separated from the outer circumferential surface, and a first distance is less than a second distance in a circumferential direction of the roll sheet, the first distance being a distance between the contact position between the first pressing body and the outer circumferential surface and a detection position of the sensor, and the second distance being a distance between the contact position between the first pressing body and the outer circumferential surface and the contact position between the second pressing body and the outer circumference surface.

15. The printing apparatus according to claim 1, wherein the first pressing body presses the roll sheet held in the holding unit at a lower position, with respect to the gravity direction, than a rotation center of the roll sheet.

* * * * *